(12) United States Patent
Bozarth et al.

(10) Patent No.: US 7,929,446 B2
(45) Date of Patent: Apr. 19, 2011

(54) MESH NETWORKING FOR WIRELESS COMMUNICATIONS

(75) Inventors: Brad Bozarth, Mountain View, CA (US); Thomas Mader, Los Gatos, CA (US); Jano Banks, Cupertino, CA (US)

(73) Assignee: Radiient Technologies, Inc., Cupertino, CA (US)

( * ) Notice: Subject to any disclaimer, the term of this patent is extended or adjusted under 35 U.S.C. 154(b) by 755 days.

(21) Appl. No.: 11/969,737

(22) Filed: Jan. 4, 2008

(65) Prior Publication Data

US 2009/0175216 A1    Jul. 9, 2009

(51) Int. Cl.
*H04L 12/26* (2006.01)
*H04L 12/28* (2006.01)
*H04W 4/00* (2009.01)
*H04B 17/00* (2006.01)

(52) U.S. Cl. ...... 370/235; 370/328; 370/400; 455/67.11

(58) Field of Classification Search .......... 370/229–239, 370/276–282, 310–350, 395.2–396, 400–406; 455/59–72, 449–453; 709/217–219, 223–226, 709/230–237
See application file for complete search history.

(56) References Cited

U.S. PATENT DOCUMENTS

| 7,701,858 | B2 * | 4/2010 | Werb et al. .................... 370/241 |
| 2008/0040509 | A1 * | 2/2008 | Werb et al. .................... 709/242 |
| 2008/0084330 | A1 * | 4/2008 | Picard ..................... 340/870.02 |
| 2008/0168312 | A1 | 7/2008 | Banks et al. |
| 2009/0079883 | A1 | 3/2009 | Banks et al. |
| 2009/0081948 | A1 | 3/2009 | Banks et al. |
| 2009/0238109 | A1 * | 9/2009 | Byard et al. ................... 370/328 |
| 2010/0185753 | A1 * | 7/2010 | Liu et al. ...................... 709/219 |

FOREIGN PATENT DOCUMENTS

WO    WO 2008/085870 A2    7/2008

OTHER PUBLICATIONS

R.C. Johnson, "UWB boots HD audio standard," XP002539784, EE Times, http://ww.eetime.com/Article.jhtml?articleID=205207187, 2 pages, (Jan. 2, 2008).
"Mesh Networking," Wikipedia, http://en.wikipedia.org/wiki/Mesh_network, 3 pgs. (Nov. 13, 2007).
"Wireless Mesh Networking," Wikipedia, http://en.wikipedia.org/wiki/Wireless_mesh_network, 4 pgs. (Nov. 13, 2007).
PCT Notification of Transmittal of The International Search Report and the Written Opinion of the International Searching Authority or The Declaration for PCT Counterpart Application No. PCT/US2008/088582 Containing International Search Report, 16 pgs. (Aug. 14, 2009).

* cited by examiner

*Primary Examiner* — Tri H Phan
(74) *Attorney, Agent, or Firm* — Blakely, Sokoloff, Taylor & Zafman LLP.

(57) ABSTRACT

A method for optimizing wireless communications in a mesh network is described. The method includes transmitting a data stream from a wireless module (WM) host to a plurality of WM devices in the mesh network. The method further includes sending status messages from the WM devices to the WM host and the other WM devices. The WM devices are configured to transmit help requests and respond to help requests based on at least one WM device needing help receiving the data stream. The method further includes generating a WM host link quality map at the WM host with the WM host link quality map being dynamically updated upon receiving status messages from the WM devices.

37 Claims, 16 Drawing Sheets

MESH NETWORKING FOR WIRELESS COMMUNICATIONS

FIELD

Embodiments of the invention pertain to methods and systems to provide wireless communications in a mesh network.

BACKGROUND

In the consumer electronics and computer industries, transmission of audio signals from a host to remote device speakers has generally been accomplished over an analog wired interface comprising speaker wire. With the advent of digital audio content, the desire to maintain the pristine digital audio signal as far as possible along the audio signal chain has motivated designers to pursue digital interfaces to replace unsightly, signal-loss-prone analog speaker wires.

The High-Definition Multimedia Interface (HDMI) is an all-digital audio/video interface capable of transmitting data streams. HDMI is compatible with High-bandwidth Digital Content Protection (HDCP) Digital Rights Management technology. HDMI provides an interface between any compatible digital audio/video source, such as a set-top box, a DVD player, an optical disc player, a PC, a video game console, or an audio video (AV) receiver and a compatible digital audio and/or video monitor, such as a digital television (DTV).

FIG. 1 shows an example of a conventional prior art audio video system that includes a source, HDMI AV receiver, with a centralized amplifier connected via an HDMI cable to HDMI DVD player and also connected via an HDMI cable to a display (HDMI TV). The HDMI AV receiver is also connected via analog speaker wires to a set of 6 speakers, each connected point-to-point from the HDMI AV receiver. Speakers in FIG. 1 are identified as follows: Front Left (FL), Front Right (FR), Center (C), Surround Left (SL), Surround Right (SR), and Low Frequency Effect (LFE), also commonly referred to as a "subwoofer."

FIG. 1 contains components which can maintain pristine digital audio and video from source to display through HDMI interconnects. The interconnects from the source to the speakers still comprise analog signals via conventional speaker wires. For prior art systems containing 6 individual speakers (e.g., 5.1 surround sound), and other, more advanced systems that support up to 8 speakers (e.g., 7.1 surround sound) or more, the speaker wire interconnections not only suffer from analog signal loss, but the speaker wire interconnections can be an eyesore or be a wire-hiding challenge.

Wireless prior art systems use a hub-spoke approach that is unreliable and susceptible to frequent audio dropouts caused by audio signals being lost between transmitter and the speakers.

SUMMARY

For certain embodiments of the present invention, a method for optimizing wireless communications in a mesh network is described. The method includes transmitting a data stream from a wireless module (WM) host to a plurality of WM devices in the mesh network. The method further includes sending status messages from the WM devices to the WM host and the other WM devices. The WM devices are configured to transmit help requests and respond to help requests. The help requests are sent from one or more WM devices that need help receiving the data stream. The method further includes generating a WM host link quality map at the WM host with the WM host link quality map being dynamically updated upon receiving status messages from the WM devices.

For some embodiments, the method further includes executing a first algorithm to dynamically allocate a help fulfillment window schedule depending on the quality of links between the WM devices. The first algorithm also tunes bit rates of the data stream for each WM device depending on the quality of link between each WM device and the WM host. For an embodiment, the method further includes executing a second algorithm to select help requests to fulfill for each WM device during the help fulfillment window schedule. The method further includes generating link quality maps at each WM device with each link quality map associated with a WM device being dynamically updated upon receiving status messages from other WM devices.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Methods and systems for optimizing audio video wireless communications in a mesh network are described. A method for optimizing audio video wireless communications in a mesh network includes transmitting a data stream from a wireless module (WM) host to a plurality of WM devices in the mesh network. The method further includes sending status messages from the WM devices to the WM host and the other WM devices. The WM devices are configured to transmit help requests and respond to help requests. The help requests are sent from one or more WM devices that need help receiving the data stream. The method further includes generating a WM host link quality map at the WM host with the WM host link quality map being dynamically updated upon receiving status messages from the WM devices. For some embodiments, the method further includes generating link quality maps at each WM device with each link quality map associated with a WM device being dynamically updated upon receiving status messages from other WM devices. For certain embodiments, the data stream includes audio packets, video packets, or audio and video packets.

An intended advantage of the methods and systems for optimizing wireless communications (e.g., audio, video) is that a host centered approach, a distributed approach, or a combination of host and distributed approaches can be used to optimize the wireless communications depending on radio and spatial characteristics for an audio video system. Another intended advantage is to maximize the probability of delivered audio and video packets from a WM host to WM devices in the audio video system.

The host centered approach can dynamically allocate a help fulfillment window schedule depending on the quality of links between the WM devices in order to assign more bandwidth to a well-positioned wireless node associated with a WM device. The host can also tune bit rates of the data stream for each WM device depending on the quality of link between each WM device and the WM host in order to eliminate or minimize undelivered audio and/or video packets.

An intended advantage of the distributed approach is the ability to immediately respond to help requests caused by a transient link problem based on using the most recent link quality information stored at each WM device.

Figure 1:
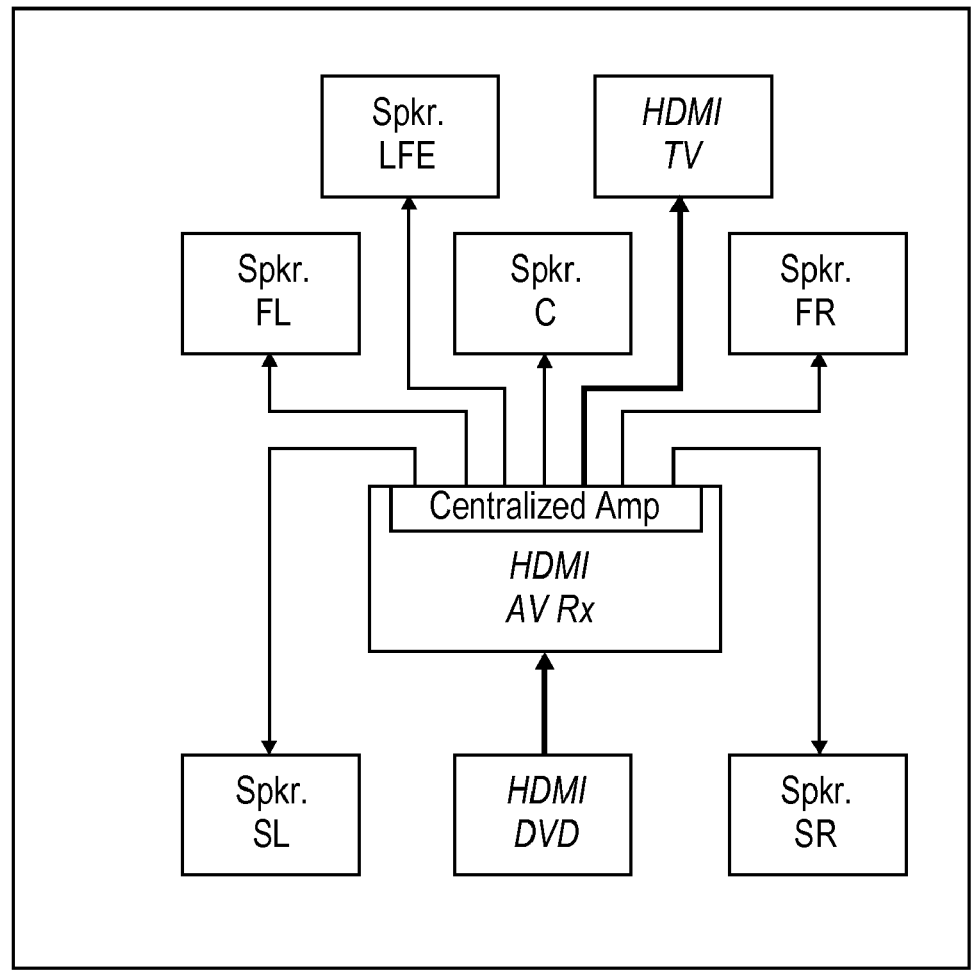
FIG. 1 is a block diagram of an example of a prior art AV system having a HDMI AV receiver coupled to analog speaker wires.
Figure 2:
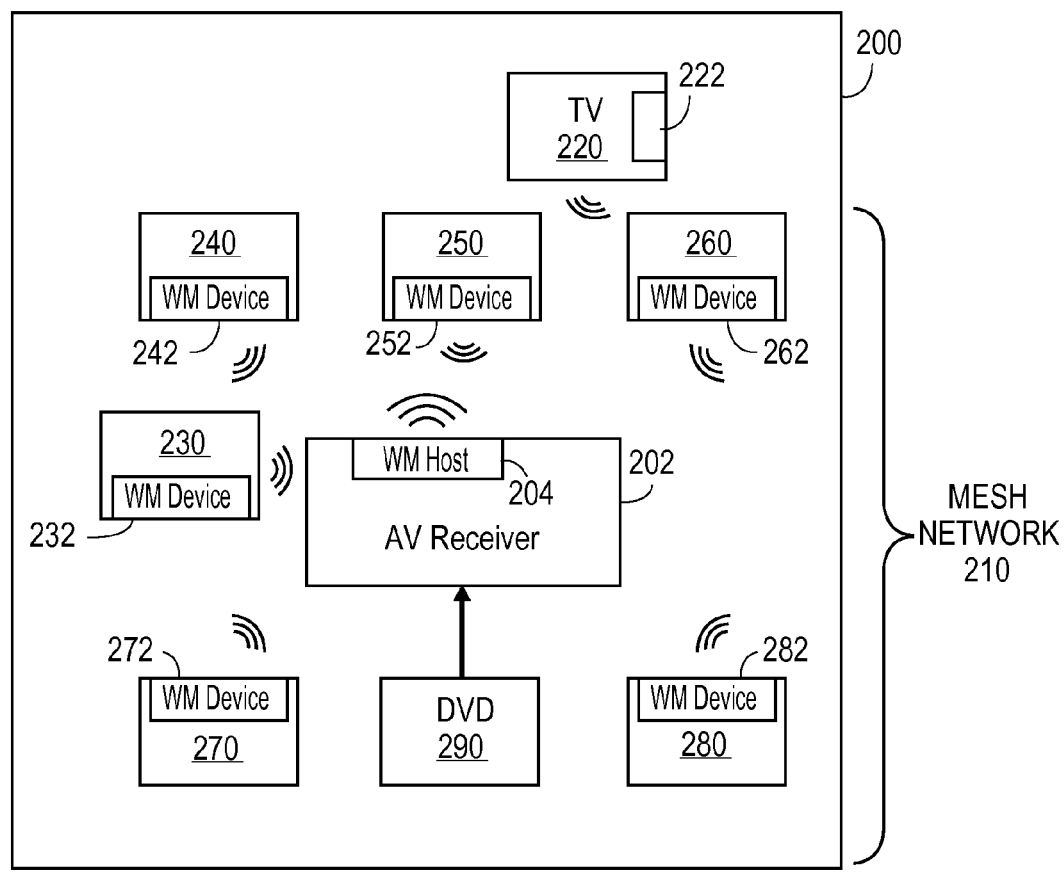
FIG. 2 is a block diagram of an apparatus having an AV receiver with a WM host 204 in communication with wireless nodes in forming a mesh network in accordance with an embodiment of the invention.

FIG. 2 is a block diagram of an apparatus having an audio video (AV) receiver with a WM host in communication with wireless nodes to form a wireless mesh network in accordance with an embodiment of the invention. The apparatus 200 includes the AV receiver 202 with a WM host 204. The AV receiver 202 can be coupled to a TV 220 and a DVD player 290 with wired and/or wireless links. For certain embodiments, the AV receiver 202 is a HDMI AV receiver which is coupled to a HDMI TV and a HDMI DVD player. The HDMI AV receiver can be a separate source component or can be located in another AV source with the functionality of the receiver being located in one of a HDMI DVD player, a HDMI TV, an integrated HDMI DVD player/TV, a DVD player, an AV receiver, a DVR, a hard disc player, an optical disc player, a blu-ray disc player, a computer, a MP3 player, a television, a phone, and a smart phone.

For one embodiment, the apparatus 200 further includes a plurality of wireless nodes 220, 230, 240, 250, 260, 270, and 280 each having a respective WM device 222, 232, 242, 252, 262, 272, and 282 to enable communication with the WM host 204 to form the wireless mesh network 210. For other embodiments, additional host(s) are included in the mesh network 210. For example, the AV receiver 202, DVD 290, and TV 220 may each include a host. For an embodiment, one host is active at a given time. The host for a particular node is active when it provides the source of the AV content and streams the audio and/or video to other nodes.

For an embodiment, the WM devices 222, 232, 242, 252, 262, 272, and 282 and the WM host 204 communicate control and data information bi-directionally to enable a low-latency, high quality stream (e.g., audio, video) to be achieved over an error-prone medium utilizing multi-path packet routing referring to as mesh networking. The WM host 204 maintains a list of all wireless receiving devices (e.g., WM devices 222, 232, 242, 252, 262, 272, and 282) and the quality of the wireless link to each device. If the link quality is too poor to sustain quality audio transmission, or the link is broken entirely, perhaps by someone walking between the WM host 204 and device, because the wireless system has low point-to-point latency and receiving devices are transceivers the WM host 204 can utilize one or more of the receiving devices as intermediaries in order to reach the device with a bad direct link. The WM host 204 can use an intermediary device for audio/video transmission, configuration requests, and state queries. Thus, the WM host 204 can directly and indirectly query all associated devices for the link quality between every node.

For one embodiment, the WM host 204 accounts for the additional latency introduced by the hops the audio and/or video packets take between wireless nodes when determining how many retries can be made. The WM host 204 also takes into consideration the available bandwidth of an intermediary device before choosing to add another stream to be routed through that device. It may make sense to route a stream through a lower quality link in order to ensure a high quality link does not become oversubscribed by too many streams using it as an intermediate route.

Using this approach, the more channels (devices) added to the audio video system in a given room, the more likely it is that the WM host 204 will be able to maintain a high quality transmission path to every device. Furthermore, this enables an embodiment to address "problem rooms" with a low-cost device that acts merely as a plug-in signal repeater node, without a speaker, amplifier, etc.

For an embodiment, the wireless nodes 230, 240, 250, 260, 270, and 280 may represent a front left speaker 240, a front right speaker 260, a center speaker 250, a surround left speaker 270, a surround right speaker 280, and a subwoofer speaker 230. Additional types and kinds of wireless speakers may be added to the apparatus 200 in accordance with certain embodiments. For another embodiment, the WM host and WM devices are wireless nodes that transmit and receive audio and/or video data for the apparatus 200 within the mesh network 210.

Note that the topology between WM host 204 and WM devices is point-to-multi-point, implemented via an Ultra Wideband (UWB) WM host 204/Device architecture. UWB has a large bandwidth with only a relatively small percentage used for an initial transmission from the WM host 204 to the WM devices. Also noteworthy is the ability for bi-directional communications over the wireless links, as depicted with the wireless beacon-like icons. For some embodiments, the WM host 204 transfers audio data, control data, video data, and auxiliary data such as help fulfillment messages in response to receiving help requests from the WM devices. Additionally, the WM devices transfer status reports or messages, control data, and help fulfillments messages to the WM host 204 and/or other WM devices in order to maximize the probability of delivered audio and video packets from a WM host to WM devices in the audio video system. The status reports may include acknowledgements of data transfers and application-specific information, such as packet reception reliability statistics.

The wireless topology of FIG. 2 reduces clutter and also enables consolidation of devices and multiple locations of the WM host 204, as shown in FIGS. 2-5. In each of FIGS. 3-5, an AV source (e.g., 302, 402, 502) with a WM host may be a HDMI DVD player, a HDMI TV, an integrated HDMI DVD player/TV, an AV receiver, a DVD player, a DVR, a hard disc player, an optical disc player, a blu-ray disc player, a computer, a MP3 player, a television, a phone, a smart phone, etc., that transmits content such as audio/video data, control data, and auxiliary data.

Figure 3:
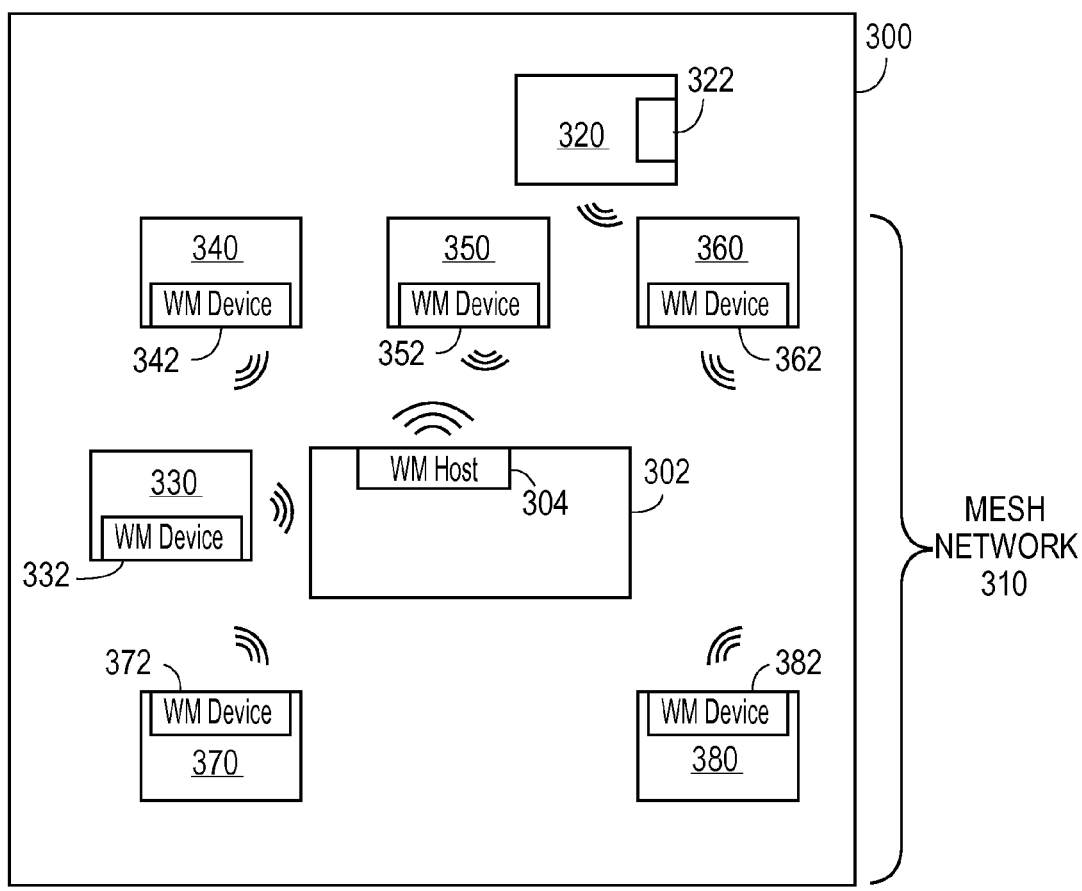
FIG. 3 is a block diagram of an AV system having an AV source with a WM host in communication with wireless nodes in forming a mesh network in accordance with an embodiment of the invention.

FIG. 3 is a block diagram of an AV system having an AV source with a WM host in communication with wireless nodes to form a mesh network in accordance with an embodiment of the invention. The system 300 includes the AV source 302 (e.g., HDMI DVD player) with the WM host 304. For one embodiment, the system 300 further includes a plurality of wireless nodes 320, 330, 340, 350, 360, 370, and 380 each having a respective WM device 322, 332, 342, 352, 362, 372, and 382 to enable communication with the WM host 304 in forming a mesh network 310. For an embodiment, the AV source 302 is a HDMI DVD player and the node 320 is a HDMI display. The WM devices and WM host 304 communicate control and data information bi-directionally for various purposes including transmitting AV data streams to the wireless nodes.

For an embodiment, the AV source 302 is a home theatre in a box (HTIB) with a wireless module (WM) host 304. The plurality of wireless nodes may be wireless speakers each having a wireless transceiver (e.g., WM device 332, 342, 352, 362, 372, or 382) to enable bi-directional communications with the WM host 304.

Figure 4:
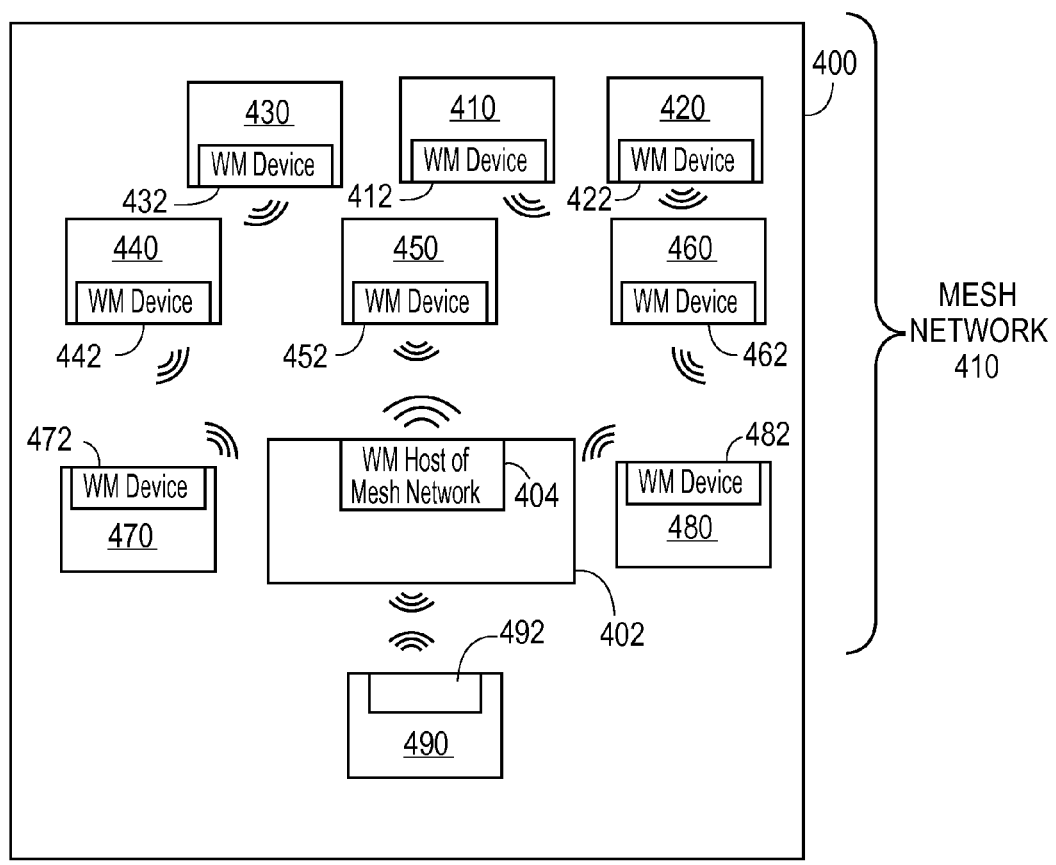
FIG. 4 is a block diagram of an AV system having a display with a WM host in communication with wireless nodes in forming a mesh network in accordance with an embodiment of the invention.

FIG. 4 is a block diagram of an AV system having an AV source (e.g., display) with a WM host in communication with wireless nodes to form a mesh network in accordance with an embodiment of the invention. The system 400 includes the AV source 402 (e.g., display or HDMI display) with the WM host 404. For one embodiment, the system 400 further includes a plurality of wireless nodes 410, 420, 430, 440, 450, 460, 470, 480, and 490 each having a respective WM device 412, 422, 432, 442, 452, 462, 472, 482, and 492 to enable communication with the WM host 404 in forming the mesh network 410.

For an embodiment, the AV source 402 is a display receiving an HDMI input. The WM host 404 communicates over a wireless link to a HDMI DVD player 490 and associated WM device 492. The WM host 404 transmits AV content to the other nodes. For another embodiment, the WM device 492 is configured to be a WM host that transmits AV content from the node 490 (e.g., HDMI DVD player) to the other nodes including the AV source 402. In this case, the WM host 404 is configured to be a WM device and receive AV data, control data, and/or auxiliary data from node 490. The mesh network 410 can have a WM host 404 centered approach, a distributed approach among the wireless nodes, or a combination of the host centered and distributed approaches depending on the requirements of a particular application in order to optimize audio video quality and minimize audio video dropouts resulting from packets that are not transferred between the WM host 404 and the WM devices.

Figure 5:
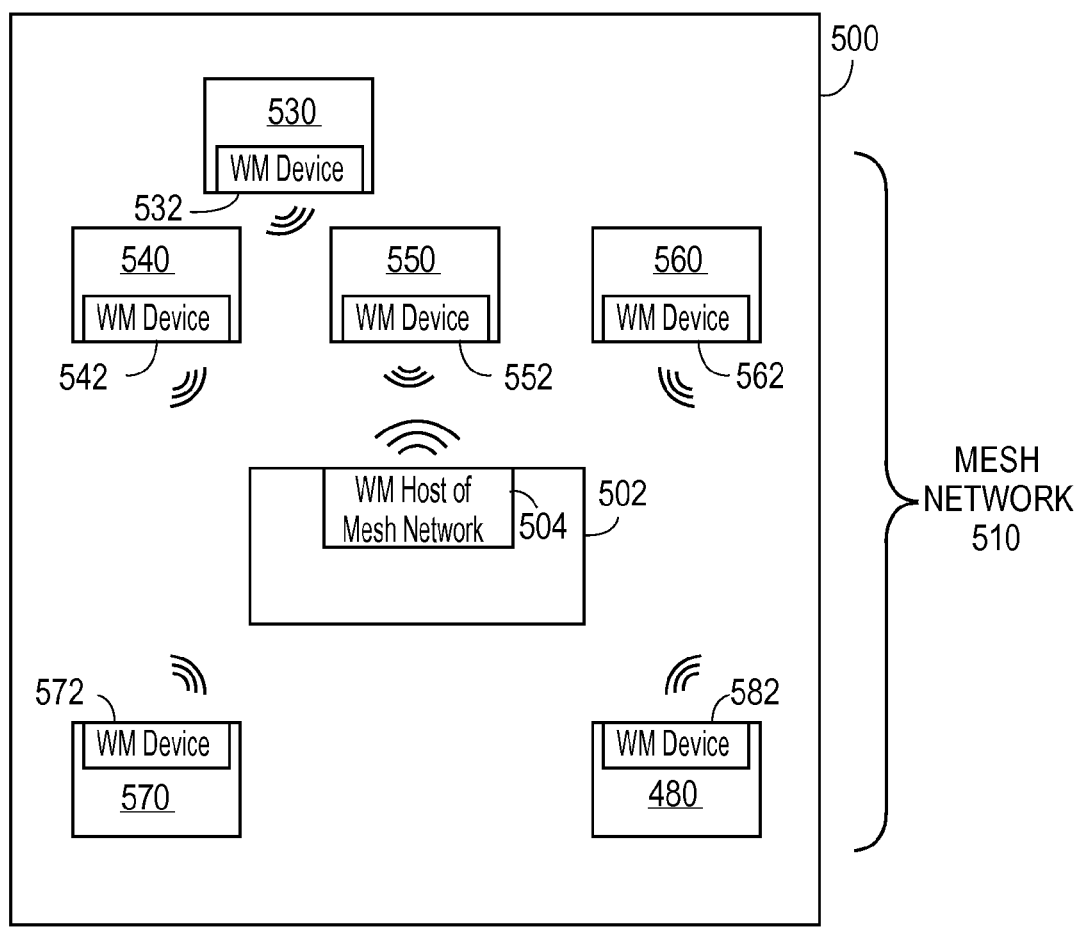
FIG. 5 is a block diagram of an AV system having an AV source with a WM host in communication with wireless nodes in forming a mesh network in accordance with another embodiment of the invention.

FIG. 5 is a block diagram of an AV system having an AV source (e.g., integrated DVD player and display) with a WM host in communication with wireless nodes in forming a mesh network in accordance with an embodiment of the invention. The system 500 includes the AV source 502 (e.g., integrated DVD player and display, a HDMI integrated DVD player and display) with the WM host 504. For one embodiment, the system 500 further includes a plurality of wireless nodes 530, 540, 550, 560, 570, and 580 each having a respective WM device 532, 542, 552, 562, 572, and 582 to enable communication with the WM host 504 in forming the mesh network 510. The WM devices and WM host 504 communicate control, data, and auxiliary information bi-directionally for various purposes including audio and/or video streaming to the wireless nodes (e.g., wireless speakers, displays, remote control device). The wireless nodes may be configured to adjust various parameters (volume, power, display format) local to the wireless node. For example, a user can adjust the volume of a particular wireless speaker using an input device associated with the wireless speaker. This wireless speaker then sends a command to the WM host providing the adjusted volume setting for the speaker.

For an embodiment, FIGS. 2, 3, and 5 illustrate various AV systems with 5.1 surround sound based on having a plurality of wireless speakers including a front left speaker, a front right speaker, a center speaker, a surround left speaker, a surround right speaker, and a first low frequency effect (LFE) speaker. For one embodiment, the various AV systems may further include a side left surround speaker and a side right surround speaker to provide 7.1 surround sound as illustrated in FIG. 4. For another embodiment, the various AV systems may further include a second LFE speaker. The various AV systems can provide up to 127 separate wireless channels enabling various surround sound arrangements such as 10.2 theatre surround, 22.2 surround, or 22.3 surround.

For certain embodiments, the AV systems provide wireless links for communicating audio and/or video data, control data, and auxiliary data to the wireless nodes. The wireless nodes may include one or more displays for displaying the video data.

Figure 6:
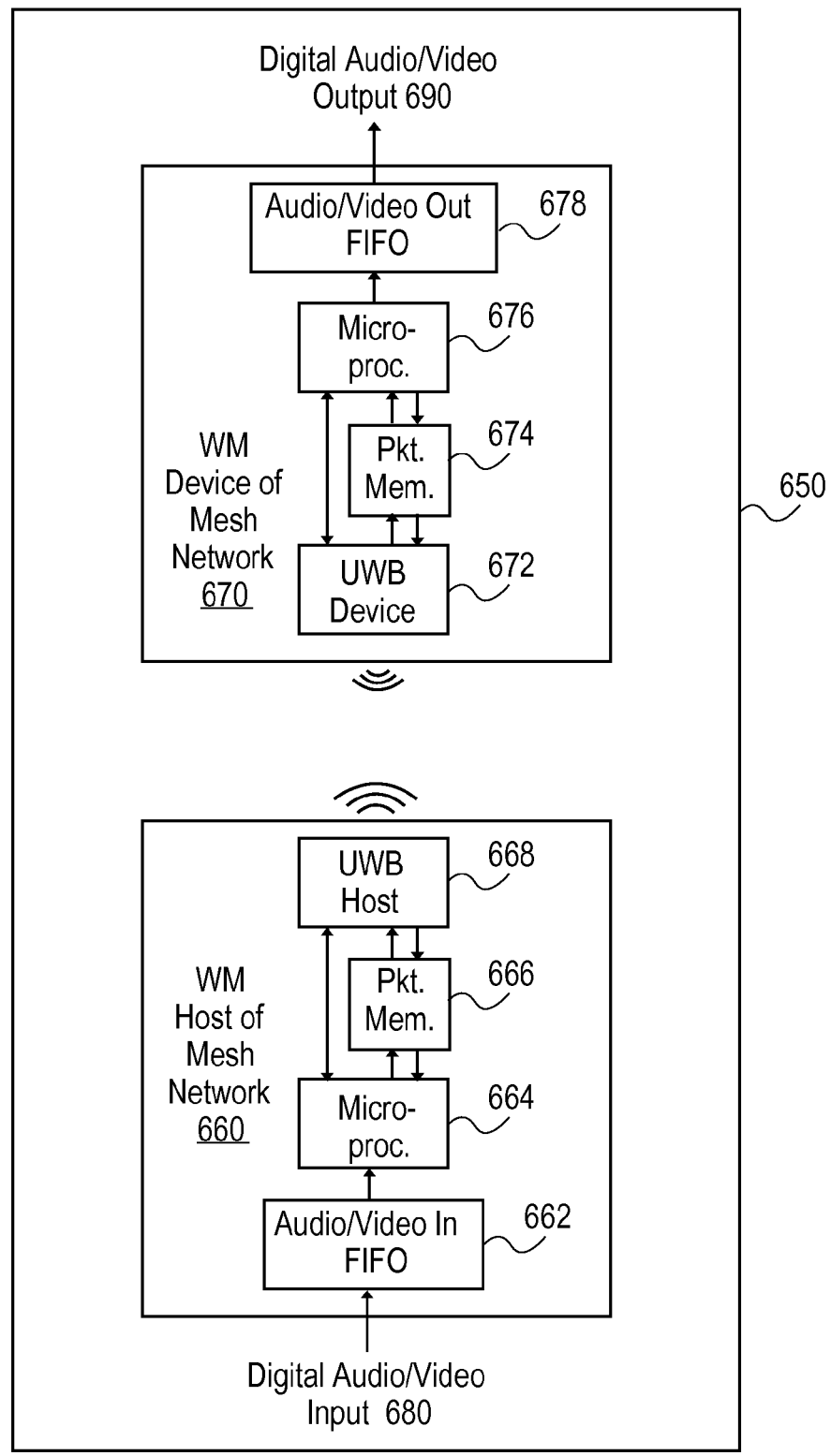
FIG. 6 is a block diagram of a system with a WM host communicating with a WM device of a mesh network in accordance with an embodiment of the invention.

FIG. 6 is a block diagram of a system with a WM host communicating with a WM device of a mesh network in accordance with an embodiment of the invention. The WM host 660 includes an AV-in first-in first-out buffer ("FIFO") 662, a microprocessor 664, memory 666 allocated for packet storage, and a UWB WM host 668.

For one embodiment, memory 666 stores packets for delivery to various wireless nodes. The memory 666 stores a particular packet for twenty milliseconds or less in order to ensure that no lip synchronization issues occur for an audio video system. Humans can detect a delay greater than twenty milliseconds for video and audio signals synchronized during post-production and transmission. For an embodiment, the WM host transmission to WM devices triggers a sixteen millisecond window in which the WM device reproduces the audio packets, for example, with a speaker cone prior to expiration of the sixteen millisecond window. For another embodiment, a wireless node has a built in delay that can be used by other nodes of the AV system. For example, a display may have a built in delay prior to displaying video data. Other nodes can take advantage of this delay by having more time to receive AV packets from the display and fulfill help requests.

The packets can be interleaved (e.g., front left and front right speakers) with $I^2S$, or Inter-IC Sound, or Integrated Interchip Sound. $I^2S$ is an electrical serial bus interface standard used for connecting digital audio devices together. Alternatively, if the host processor has a sufficient amount of cycles, the interleaved $I^2S$ can be split into per-channel packet ring buffers. This allows more efficient use of bandwidth during retransmission between WM host and WM devices.

The WM device 670 includes an AV-out FIFO 678, a microprocessor 676, memory 674 allocated for packet storage, and a UWB device 672. The system 650 receives digital audio input 680 from a source, sends it wirelessly over UWB, and produces digital audio output 690 from each device 670. The microprocessor included in each WM device must perform sophisticated management and execute complex algorithms tailored to the wireless medium and the dynamic system requirements.

Although not shown in FIG. 6, the WM host must process and transmit all digital audio channels, while a WM device might only consume a single audio channel. The WM host's management of communications, data routing, and synchronization for all the audio channels supported in a system is a significant task. For an embodiment, the WM device 670 and WM host simultaneously send and receive audio and video communications.

Figure 7:
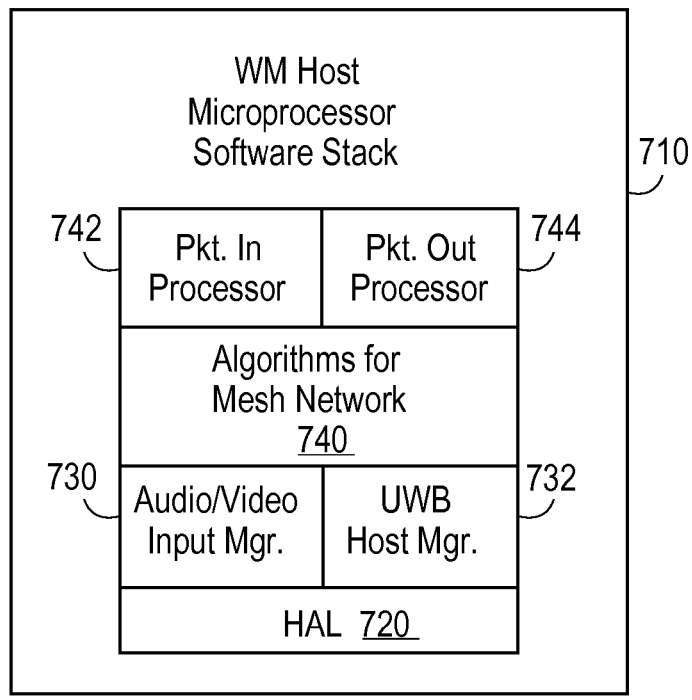
FIG. 7 is a block diagram of a WM host microprocessor software stack of a mesh network in accordance with an embodiment of the invention.
Figure 8:
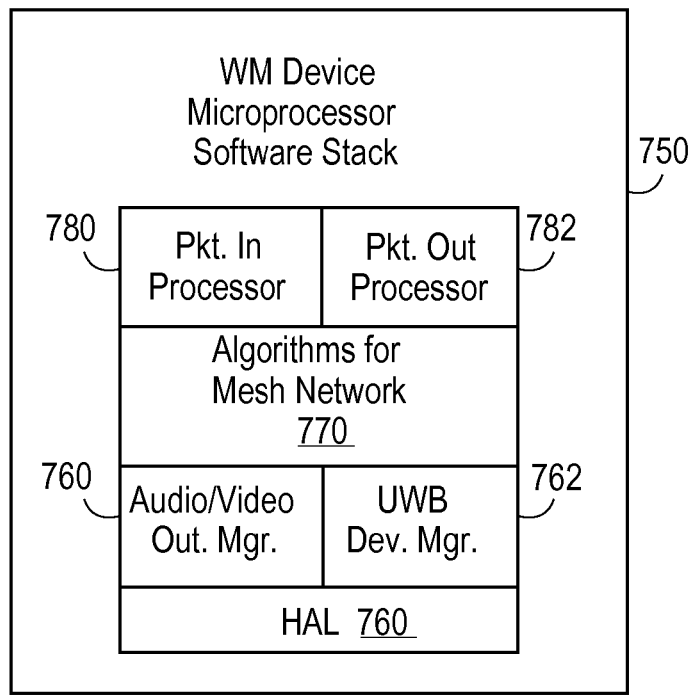
FIG. 8 is a block diagram of a WM device microprocessor software stack of a mesh network in accordance with an embodiment of the invention.

For the embodiment utilizing UWB as the wireless medium in a mesh network, the WM Host and WM Device Microprocessor Software Stacks are illustrated in FIG. 7 and FIG. 8. The WM Host and WM Device software stacks 710 and 750 are, at a high level, similar to each other. They consist of Hardware Abstraction Layers (HAL) 720 and 760 to allow for support of multiple hardware implementations. The Audio/Video In Manager 730, UWB Manager 732, Audio/Video Out Manager 760, and UWB Device Manager 762 are formed above the HAL. A key portion of the software stack is contained in the Algorithms 740 and 770, as it is in this section that much of the embodiment of the invention is contained. The WM Host Algorithms 740 are used to implement a host centered approach that forms a host link quality map of the mesh network, designed for the control and operations across the medium with audio or video as the payload. The WM Device Algorithms 770 are used to implement a distributed approach that forms a link quality map for each WM device of the mesh network. Because both the WM Host and WM Device both send and receive data, they both contain Packet Input Processors 742 and 780 as well as Packet Output Generators 744 and 782.

Figure 9:
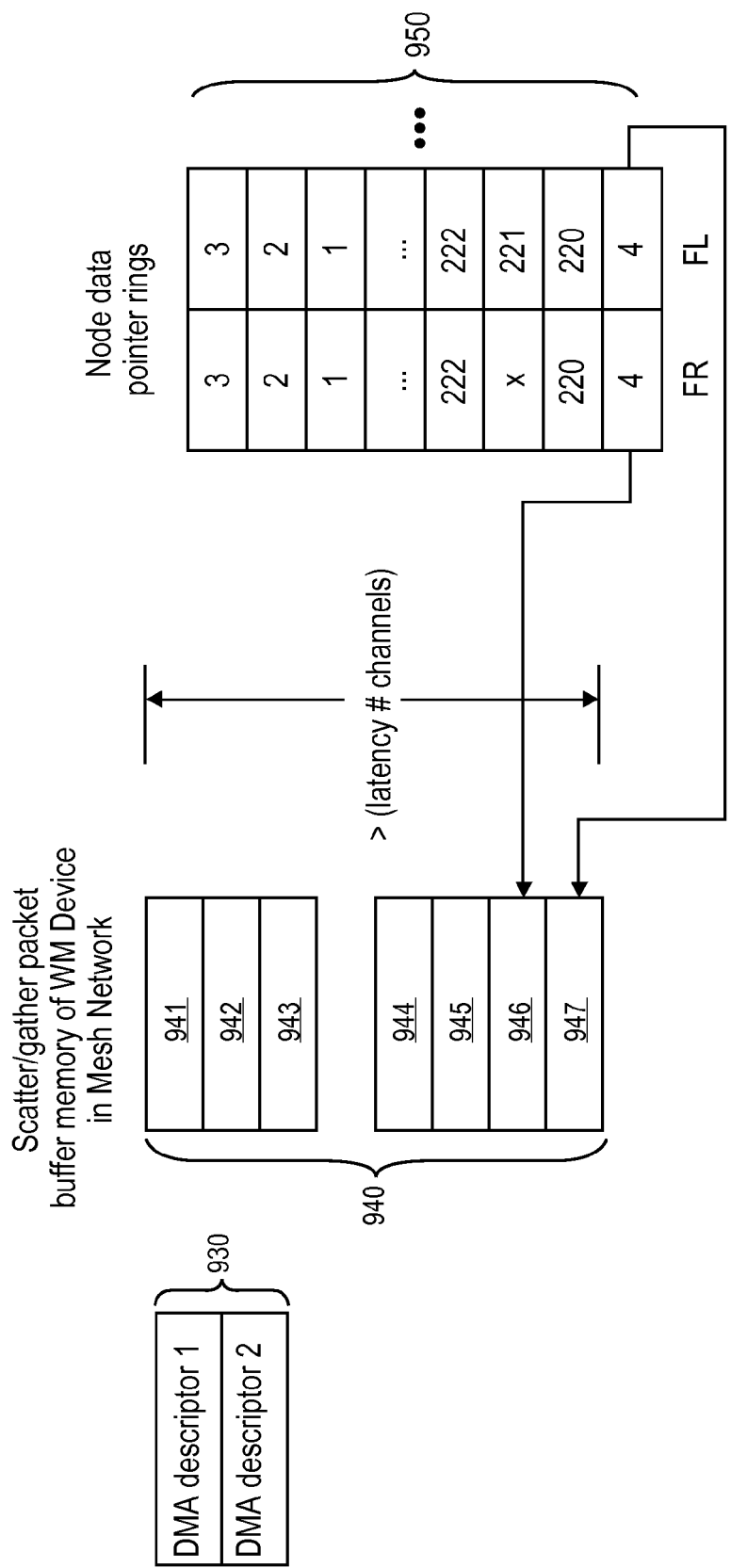
FIG. 9 is a block diagram of a memory buffer for packet storage in a WM device communicating with a WM host of a mesh network in accordance with an embodiment of the invention.

FIG. 9 is a block diagram of a memory buffer for packet storage in a WM device communicating with a WM host of a mesh network in accordance with an embodiment of the invention. For an embodiment, a packet includes a 5-byte WiMedia ultra wideband (UWB) header and a 5-byte audio video header. WiMedia is a radio platform standard for high-speed ultra wideband wireless connectivity. The header conforms to the WiMedia UWB specification. The header includes a source node identifier, a destination node identifier, type/flags, and a sequence number.

One packet type is a ring size control packet that sizes node data pointer rings 950 for a particular node (e.g., front right, front left) for control or stream packets destined to other nodes. The node data pointer rings 950 points to a memory buffer such as scatter/gather packet buffer memory 940 located in a WM device. The node data pointer ring X represents a missing packet that was not received by a WM device.

The pointer rings 950 provide an index to quickly access packets found in the buffer 940. For example, the access rate for the buffer 940 scales linearly with data size. However, the access rate for the pointer rings 950 does not scale linearly with data size and the pointer rings only have a 4-byte pointer associated with a given packet stored in the buffer 940. Thus, the pointer rings 950 permit faster access to the packets stored in the buffer 940.

For an embodiment, a WM host (not shown) sends packets 930 with direct memory access (DMA) descriptors to the buffer 940 of a WM device. The packets 941-947 have a format of source, destination, and sequence number. For example, a packet may be sent from a source center node to a destination host node with a sequence #1. For another example, a packet may be sent from a source front left node in the form of a status report to other nodes with sequence #23. Each node has a sufficient amount of buffer memory to store packets destined for this node and also packets that are transferred to other nodes as well. For example, the sufficient amount of memory may be greater than a threshold latency times a number of audio and/or video channels in the mesh network. For one embodiment, the node data pointer rings 950 organize the packets according to destination node to quickly access any of these packets. Additionally, each node can create a map of the mesh network with statistical parameters such as link quality between all nodes in the mesh network.

An example audio packet type is a local playback buffer size reconfiguration type in case a node that is transmitting packets is a long distance in terms of the mesh network away from other nodes because of hops and/or congestion. The WM host can tell this node to decrease its local buffer to compensate. This can also be used to configure delay based on speaker position relative to listener. Other types of audio packets include volume, samples, end stream, begin stream, equalization, radio reconfiguration, channel assignment, various association packets, and a retransmit request packet that includes a time left before a packet must arrive to satisfy an expiring time window for retransmitting.

For an embodiment, types of video packets include a resolution packet (e.g., 720i, 720p, 1080i, 1080p), an aspect ratio packet (e.g., 1.85:1, 2.39:1, 4:3, 16:9), and a content protection packet.

Figure 10:
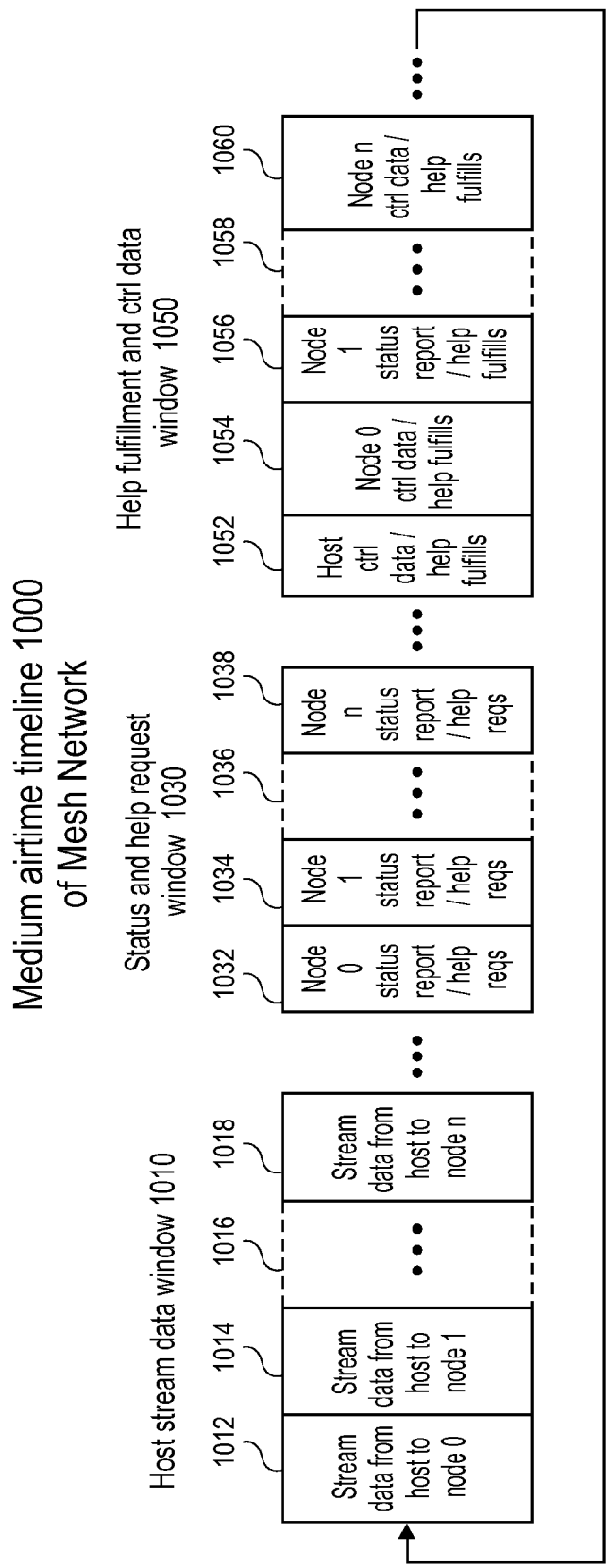
FIG. 10 illustrates a timeline of streaming data in a mesh network in accordance with an embodiment of the invention.

FIG. 10 illustrates a timeline of data streams in a mesh network in accordance with an embodiment of the invention. A WM host transmits data window 1010. This window 1010 includes stream data window 1012 having data that is transmitted from the host to node 0, data window 1014 having data that is transmitted from the host to node 1, data window 1016 having data that is transmitted from the host to a node, and data window 1018 having data that is transmitted from the host to node "n" of the mesh network. Subsequently, a status and help request window 1030 is transmitted from various wireless nodes to other nodes and the host. The window 1030 includes windows 1032, 1034, 1036, and 1038. Each of these windows includes a status report and/or help request from a node that is sent to the other nodes and possibly the host as well. The status report from a particular node includes an array with statistical information regarding link quality between the particular node and some or all other nodes within the mesh network.

A help request indicates that the particular node that sends this request is missing a packet that was transmitted from the host during the host stream data window 1010. For one embodiment, the host stream data window 1010 has a fixed time period with a fixed number of windows. Each audio and/or video packet has a fixed size with the same number of bytes for a given time frame. A node expects to receive a certain number of packets per unit of time and will know if it fails to receive one or more of the packets during the host stream data window 1010.

Following the status and help request window 1030, a help fulfillment and control data window 1050 is transmitted. This window 1050 includes windows 1052, 1054, 1056, 1058, and 1060. The window 1052 includes control and help fulfillments messages that are transmitted from the host to other nodes. A help fulfillment message responds to a previous help request received during the window 1030. The help fulfillment message includes the missing packet(s) that has been requested by the help request. The windows 1054, 1056, 1058, and 1060 include control data and help fulfillment messages from various nodes that are sent to other nodes and/or the host. Subsequently, the timeline 1000 restarts with a new host data window 1010 being transmitted from the host.

The timeline 1000 illustrates various types of windows. Each of the windows 1010, 1030, and 1050, as well as the allocation within these windows, can be adjusted based on the requirements of a given application. For example, the window 1050 is adjusted based on the amount of bandwidth of the UWB available following the streaming of the windows 1010 and 1030. Window 1030 can be allocated on a round robin basis to enable each node a window of time to transmit status reports and potential help requests if needed.

For an embodiment, the timeline 1000 is for audio data that shares a finite bandwidth with video data. A non-linear mapping for allocation of bandwidth between audio and video data may occur depending on the characteristics of a radio that transmits the data within the mesh network. It may be necessary to increase the window 1050 in order to eliminate audio dropouts. This can be achieved by decreasing the bit rate or bit depth of the audio samples of the data window 1010 or by reducing the bandwidth for video data.

Figure 11:
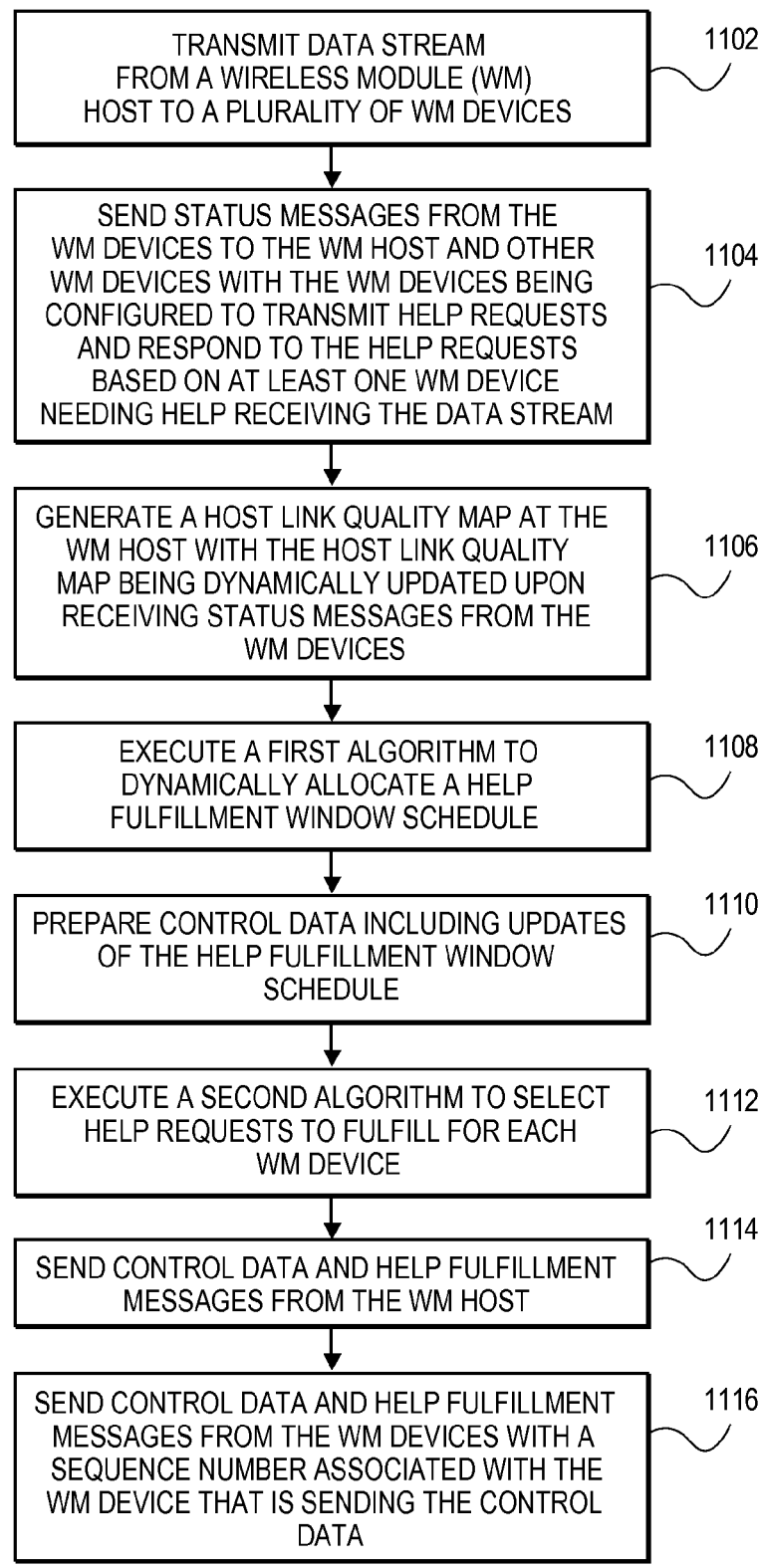
FIG. 11 is a flowchart of a method for optimizing wireless communications in a mesh network in accordance with an embodiment of the present invention.

FIG. 11 is a flowchart of a method for optimizing wireless communications in a mesh network in accordance with an embodiment of the present invention. The method maximizes the probability of delivered audio and video packets from a WM host to WM devices in the audio video system. The method includes transmitting a data stream from a wireless module (WM) host to a plurality of WM devices in the mesh network at block 1102. The method further includes sending status messages from the WM devices to the WM host and the other WM devices with the WM devices being configured to transmit help requests and respond to help requests based on at least one WM device needing help receiving the data stream at block 1104. The method further includes generating a WM host link quality map at the WM host with the WM host link quality map being dynamically updated upon receiving status messages from the WM devices at block 1106. The method further includes executing a first algorithm to dynamically allocate a help fulfillment window schedule at block 1108.

For an embodiment, the first algorithm is a host probabilistic prioritization algorithm (HPPA) for dynamically allocating the help fulfillment window schedule (e.g., window 1050) depending on the quality of links between the WM devices. The WM host can allocate a longer time window for a well-positioned node that is a better help node in providing help fulfillment of help requests for other nodes. The first algorithm also tunes bit rates of the data stream for each WM device depending on the quality of link between each WM device and the WM host. The HPPA is an asynchronous process that runs continually. This process receives input from status reports from various nodes and generates new fulfillment window schedules to be distributed using control packets. The first algorithm may be used to optimize an explicit schedule or round robin schedule for the fulfillment window.

The method further includes preparing control data including updates of the help fulfillment window schedule at block 1110. The method further includes executing a second algorithm at each WM device to select help requests to fulfill for each WM device at block 1112. For an embodiment, the second algorithm is a fulfillment probabilistic prioritization algorithm (FPPA) that is executed by each WM device of the mesh network in order to determine how each WM device uses its help fulfillment window in responding to help requests. Alternatively, for a host centered approach, the host can control the selection of help request to be fulfilled for each WM device.

The method further includes sending control data and help fulfillment messages from the WM host at block 1114. The method further includes sending control data and help fulfillment messages from the WM devices with a sequence number associated with the WM device that is sending the control data at block 1116.

For some embodiments, the method further includes determining whether any WM devices are missing data from the WM host. The method further includes resending the data to WM devices needing the data with an implied help request and desired expiration that other WM devices will service. The method further includes generating link quality maps at each WM device with each link quality map associated with a WM device being dynamically updated upon receiving status messages from other WM devices. The WM host link quality map includes link quality information for direct wireless links between the WM host and directly linked WM devices and also indirect wireless links between the WM devices.

It should be noted that the above method and other methods disclosed in this invention can be implemented in a different order with additional or fewer operations. For example, the method disclosed above may include the first algorithm but not the second algorithm or vice versa.

Figure 12:
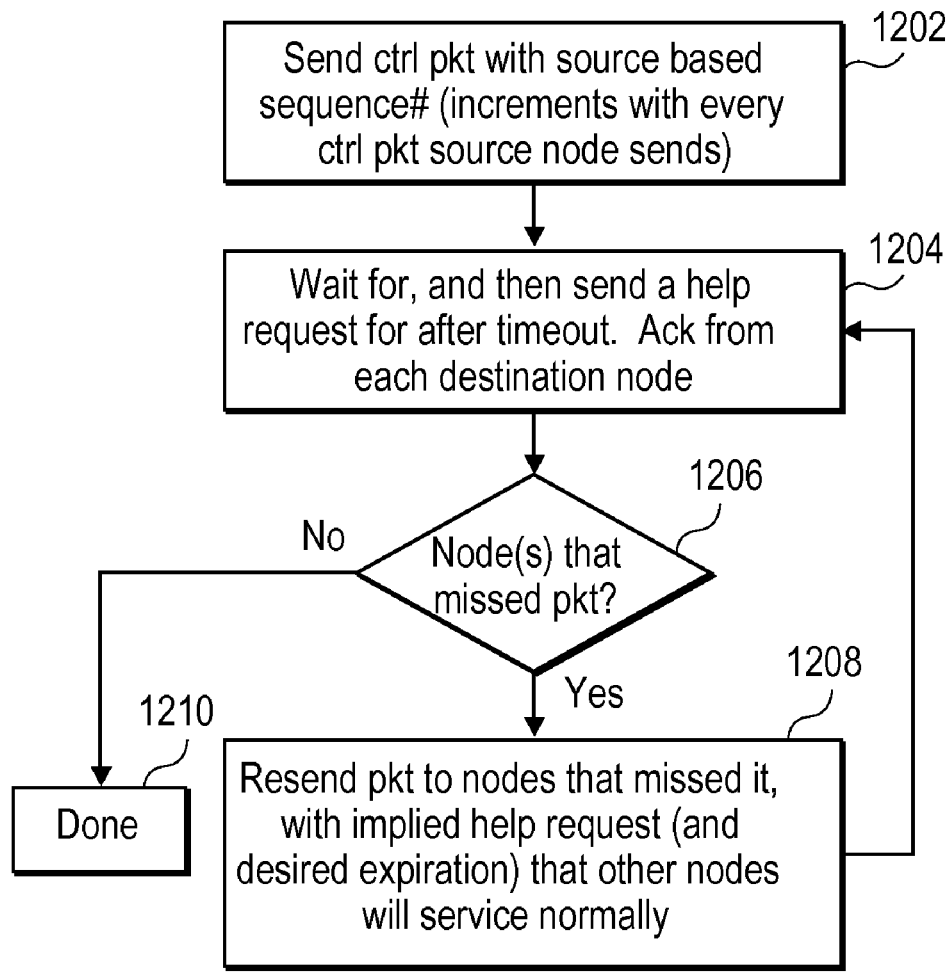
FIG. 12 is a flowchart of a method for sending control packets within a wireless mesh network in accordance with an embodiment of the present invention.

FIG. 12 is a flowchart of a method for sending control packets within a wireless mesh network in accordance with an embodiment of the present invention. The method includes sending a control packet with a source based sequence number. This number is incremented with every control packet sent by the source node at block 1202. The method further includes waiting for and then sending a help request after a timeout period at block 1204. Each destination node receiving the help request sends an acknowledgement message to the source node of the help request. The method further includes determining whether any node(s) are missing one or more packets at block 1206. The method further includes resending the one or more missing packets to nodes needing the one or more packets at block 1208. The packets that are resent include an implied help request and desired expiration that other nodes will service when these nodes receive their allocated time window for resending packets. If no nodes missed packets, then the method finishes at block 1210.

Figure 13:
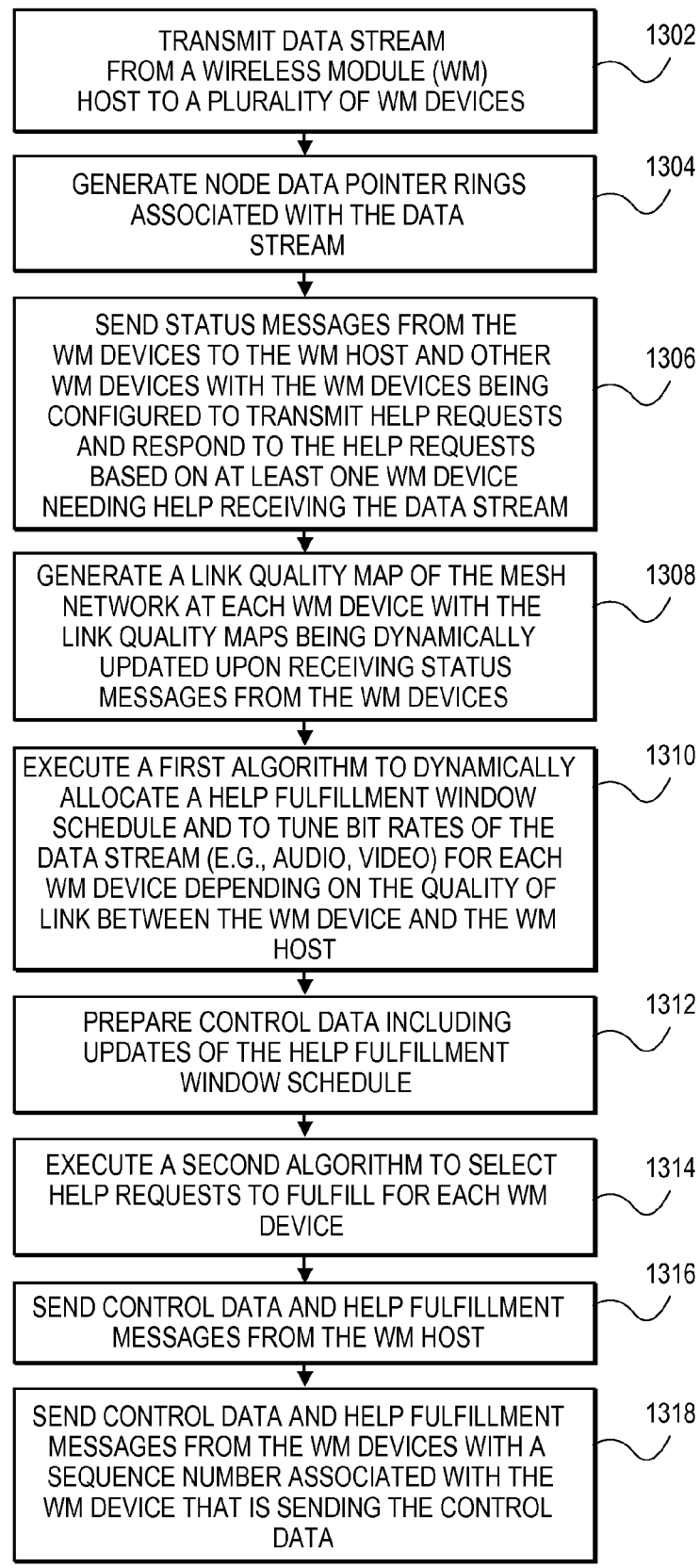
FIG. 13 is a flowchart of a method for optimizing wireless communications in a mesh network in accordance with another embodiment of the present invention.

FIG. 13 is a flowchart of a method for optimizing wireless communications in a mesh network in accordance with another embodiment of the present invention. The method includes transmitting a data stream (e.g., audio, video) from a wireless module (WM) host to a plurality of WM devices in the mesh network at block 1302 with the data stream being stored in a memory buffer of each WM device. The method further includes generating node data pointer rings associated with the data stream that is stored in the memory buffer at block 1304. The method further includes sending status messages from the WM devices to the WM host and the other WM devices with the WM devices being configured to transmit help requests and respond to help requests based on at least one WM device needing help receiving the data stream at block 1306. The method further includes generating a link quality map of the mesh network at each WM device with the link quality maps being dynamically updated upon receiving status messages from the WM devices at block 1308.

For one embodiment, the link quality between two nodes (a, b) is calculated using a tunable weighting such that more recent received and/or missed status packets from node "a" affect the link quality more than those that occurred earlier in time. For another embodiment, a linear calculation of link quality equals a number of received packets divided by a number of expected packets for each node. For another embodiment, a weighted version is calculated in a similar manner, except that the nth most recent success or miss contributes a 1.1 ratio to the numerator and denominator, (n−1)th is a 1.3 ratio, most recent contributes (denominator/6) to numerator and denominator. The weights and "n" are tunable to reflect how recent performance correlates with expected performance, given the particular characteristics of the medium in use.

The method further includes executing a first algorithm to dynamically allocate a help fulfillment window schedule and to tune bit rates of the data stream (e.g., audio, video) for each WM device depending on the quality of link between the WM device and the WM host at block 1310. The help fulfillment window schedule can be determined by one of an explicit schedule (e.g., round robin schedule controlled by the host) and a distributed approach utilizing a randomized contention mechanism such as prioritized contention access (PCA) available with the WiMedia specification. The explicit schedule can be optimized using the knowledge obtained from executing the first algorithm.

The method further includes preparing control data including updates of the help fulfillment window schedule at block 1312. The method further includes executing a second algorithm to select help requests to fulfill for each WM device at block 1314. For example, each WM device receives a particular help request for a particular node. Each WM device accesses its ring pointer to determine if it has the missing packet needed to fulfill the help request. The method further includes sending control data and help fulfillment messages from the WM host at block 1316. The method further includes sending control data and help fulfillment messages from the WM devices with a sequence number associated with the WM device that is sending the control data based on the second algorithm at block 1318.

For an embodiment, the WM host selects help requests to fulfill for each WM device in a host centered approach rather than having each WM device execute the second algorithm in a distributed approach. The WM host has a consistent view of the mesh network. However, the WM host does not have the most recent link quality information available at each WM device.

Figure 14:
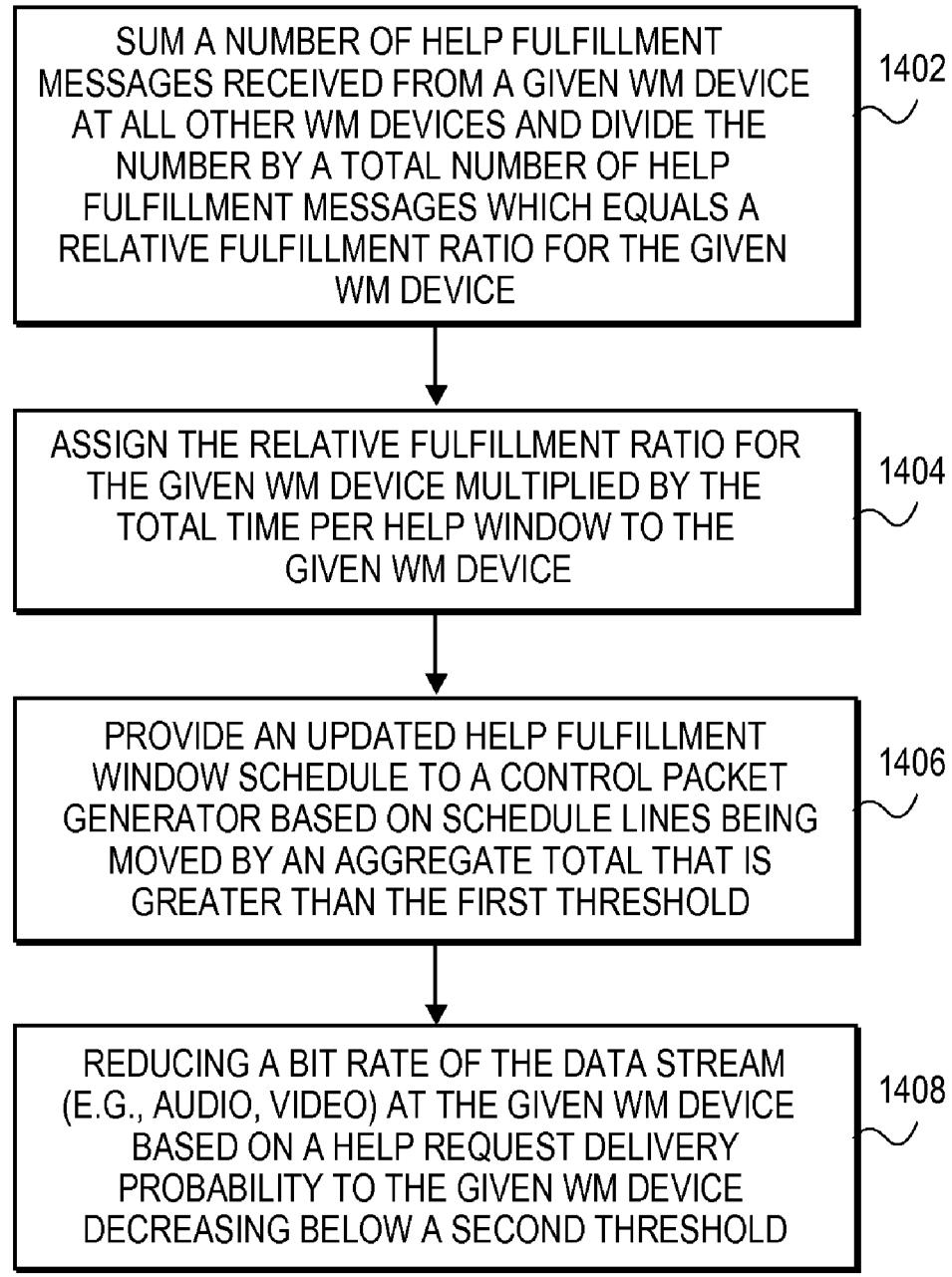
FIG. 14 is a flowchart of a method for optimizing wireless communications in a mesh network with a host probabilistic prioritization algorithm in accordance with an embodiment of the present invention.

FIG. 14 is a flowchart of a method for optimizing wireless communications in a mesh network with a host probabilistic prioritization algorithm (HPPA) in accordance with an embodiment of the present invention. The HPPA allocates bandwidth for the nodes during the help fulfillment window.

For an embodiment, a host executes the HPPA and has a consistent view of the entire mesh network. The method includes summing a number of help fulfillment messages received from a given WM device at all other WM devices and dividing the number by a total number of help fulfillment messages which equals a relative fulfillment ratio for the given WM device at block 1402. The method further includes assigning the relative fulfillment ratio for the given WM device multiplied by the total time per help window to the given WM device at block 1404. The method further includes providing an updated help fulfillment window schedule to a control packet generator based on window schedule lines being moved by an aggregate total that is greater than a first threshold at block 1406. The method further includes reducing a bit rate of the data stream (e.g., audio, video) at the given WM device based on a help request delivery probability to the given WM device decreasing below a second threshold at block 1408. The help request delivery probability for the given WM device is calculated by averaging the delivery probability average for the given WM device from all other nodes.

Each node records an expected delivery probability and then creates an average over a sliding window for each node and associated WM device being helped. This probability is equal to one if no help requests were seen from the given WM device in the associated window. Reduction of the bit rate is proportionate to an amount that the help request delivery probability exceeds the second threshold. Another threshold at a higher average delivery probability is used to increase the bit rate if conditions improve with respect to the given WM device.

Figure 15:
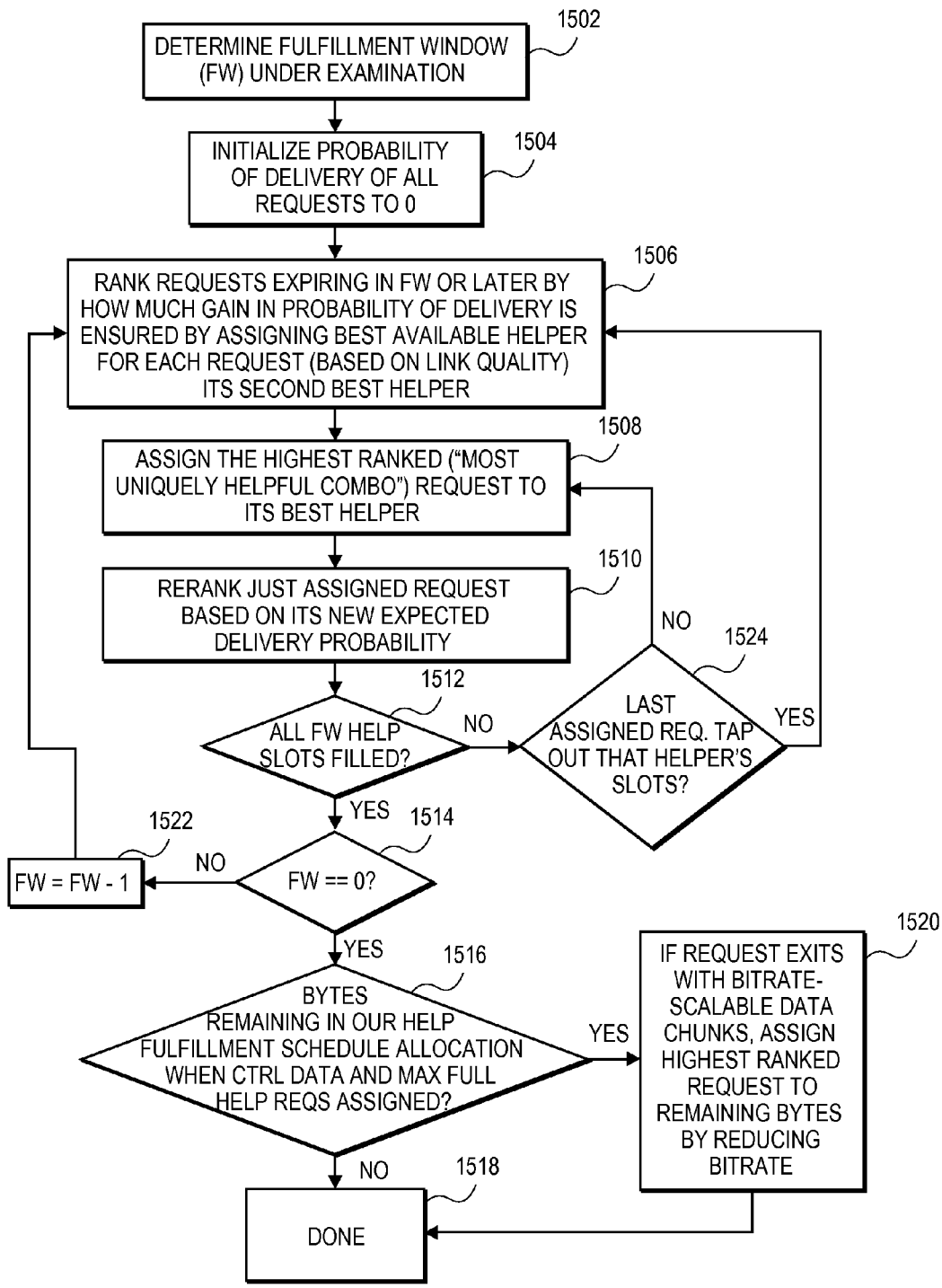
FIG. 15 is a flowchart of a method for optimizing wireless communications in a mesh network with a fulfillment probabilistic prioritization algorithm in accordance with an embodiment of the present invention.
Figure 16:
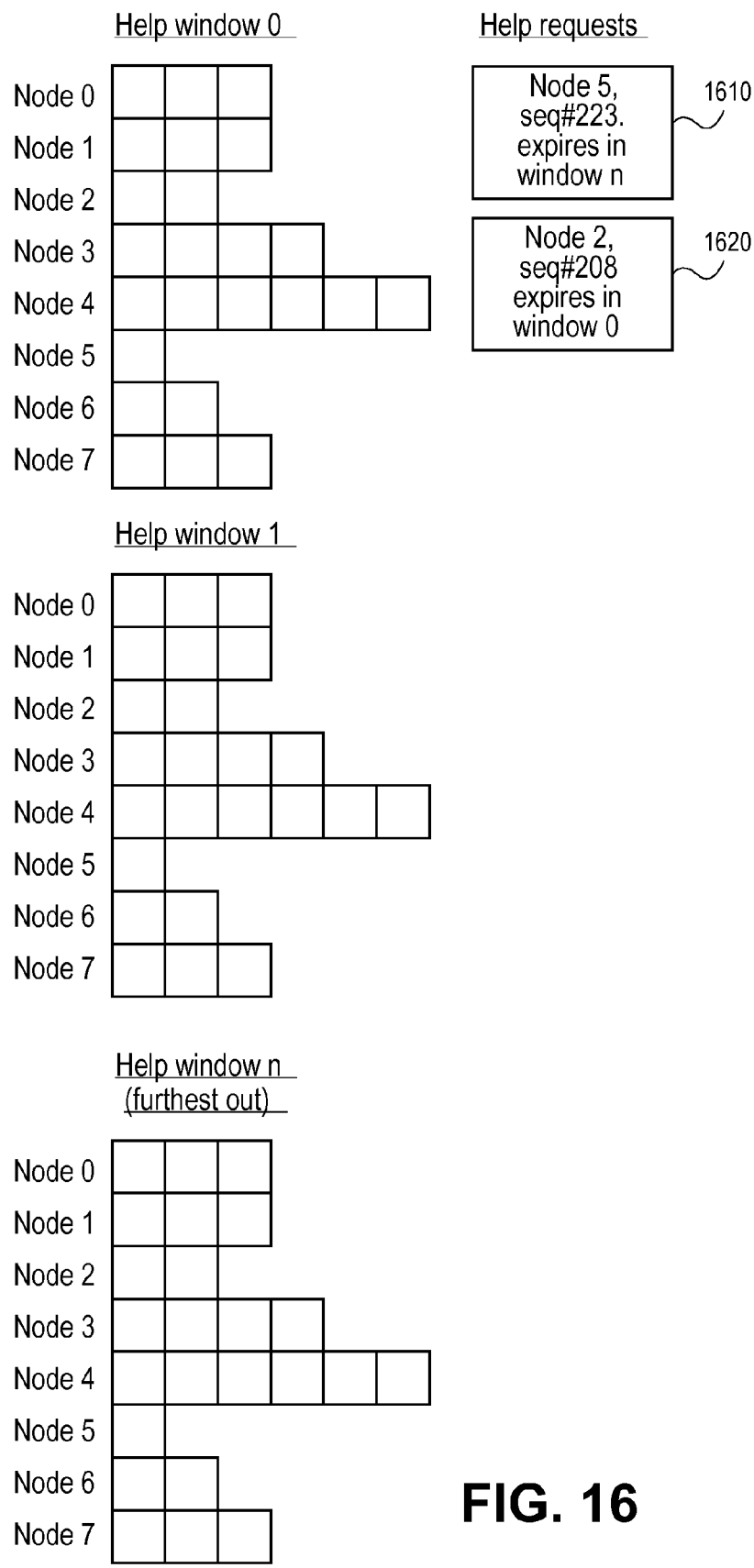
FIG. 16 is a block diagram of an example help window allocation by the fulfillment probabilistic prioritization algorithm in a mesh network in accordance with an embodiment of the present invention.

FIG. 15 is a flowchart of a method for optimizing wireless communications in a mesh network with a fulfillment probabilistic prioritization algorithm (FPPA) in accordance with an embodiment of the present invention. For one embodiment, the FPPA is executed by each WM device of the mesh network in order to determine how each WM device uses its help fulfillment window in responding to help requests. The method includes determining a current fulfillment window under examination at block 1502. This may be a fulfillment window "n" with help requests having the longest time until expiration as illustrated in FIG. 16. The fulfillment window under examination can be adjusted based on the processing resources available. The method further includes initializing a probability of delivery of all help requests to zero at block 1504. Help requests 1610 and 1620 are illustrated in FIG. 16. Each node begins with an unallocated map of all fulfillment slots over all help windows relevant to the current help request as illustrated in FIG. 16.

The method further includes ranking help requests expiring in the current fulfillment window or a later fulfillment window by how much of an increase in probability of delivery is ensured by assigning a best available helper for each help request based on link quality compared to a second best helper at block 1506. For an embodiment, the probability that a given single assignment will succeed is based on link quality (LQ) between nodes (a, b). The gain in probability is defined as (new P(req))−P(req) where P(req) is the overall probability of the request being fulfilled given current assignments. The (new P(req)) is defined as P(req)+(1−P(req))*LQ (a, b).

The method further includes assigning a highest ranked help request to its best available helper at block 1508. The method further includes reranking the highest ranked help request based on a new expected delivery probability at block 1510. The method further includes determining if all fulfillment window help slots are filled at block 1512.

If the help slots are filled, then the method further includes determining if the current fulfillment window equals zero at block 1514. If not, then the fulfillment window is decremented at block 1522 and the method returns to block 1506. If the current fulfillment window does equal zero, then the method includes determining if bytes are remaining in the help fulfillment schedule allocation when critical data and maximum full help requests are assigned at block 1516. If bytes remain for a bit rate scalable data size, then the method assigns the highest ranked request to the remaining bytes by reducing the bit rate for these bytes at block 1520. The method completes at block 1518 following the operations at block 1516 or 1520.

Returning to block 1512, if the help slots are not filled, then the method includes determining if the last assigned request has filled that helpers time slots at block 1524. If not, then the method returns to block 1508. If the last assigned request has filled that helpers time slots, then the method returns to block 1506.

For one embodiment, when a node assigns a request from node "b" to itself, if LQ (self, b)–LQ($2^{nd}$ best, b) is greater than some threshold, and LQ (host, b) is lower than another threshold, the node preemptively issues help requests when it misses stream packets of node "b" as long as these conditions hold, since node "b" is likely to request help and the node is uniquely qualified to provide that help.

For another embodiment, after each sequence number (or a series of sequence number's) of data is sent from the host to all nodes, a relatively short, round-robin scheduled window is provided for each node to report the quality of its links to the other nodes and packets it is missing and still needs and can get via retransmission in time for playback. The requests for missing packets are help requests.

Because only one node can transmit packets at a given time, either a randomized contention mechanism such as PCA described in the Wimedia specification, or an explicit schedule is used to enable nodes to fulfill help requests in a window following the status update/help request window. Using PCA results in a fairly simple implementation, but when many nodes need help, the overhead of contending for free airtime can become prohibitive. This is also much less predictable, since implementations of PCA vary and we must rely on other Wimedia radios to cooperate and share the limited bandwidth between nodes. Furthermore, PCA itself contains random back-off periods to decide who can transmit, and thus there is no guarantee any of the nodes will be able to transmit packets, in the worst case of collision after collision. But using PCA, the bandwidth available for the immediate help request window is a large block, and a best-effort distributed decision including varying per node transmit time can be directly attempted, allowing PCA to handle access to the wireless medium.

When using an explicit schedule, random contention inefficiency is not a problem, but the per node transmit time is fixed before the help window commences. The central or distributed decisions about bandwidth usage discussed below only call out intricacies related to an explicit schedule, since the decisions reached can be directly attempted and fulfilled best-effort by PCA.

The available unused bandwidth per node is a finite resource, thus an algorithm as discussed above must be executed to decide which node should retransmit what packets. The algorithm assumes knowledge of a link quality between nodes "a" and "b" that essentially represents the percent likelihood a packet will be successfully transmitted from node "a" to node "b." This percentage is easily kept track of at the destination node, where it knows how many status packets it has heard from each node and how many total packets it would have heard if all were received successfully. This percentage can be queried for use by the host, used directly by node "b," and put into help requests to be used by potential helping nodes of node "a." For each case, the algorithm can be performed at the host with the latest information it has available assuming the host queries all nodes regularly for status, or it can be performed in a distributed manner using the internal status of the nodes. This status is contained in status updates and/or help requests.

Given time for only one node to fulfill a help request from node "b" and only one help request outstanding, the node chosen would be the node "a" having the highest link quality to node "b." In the general case, there are "n" help requests ("h") from "m" nodes, and each potential helper "a" has "a(t)" time in which to fulfill requests. Furthermore, each help request has an implied "h(R)," derived from its sequence number, which gives the number of subsequent fulfillment windows which may be used before that help request cannot be fulfilled because it should have already been rendered by "b." In every instance, if there are help requests outstanding, all available bandwidth should be used to fulfill those help requests. In one extreme case, the a(t) time of all "a" nodes is used to repeat a single missed packet. In the general case, each potential helper "a" uses the following variables to determine how to allocate his a(t):

a(t) (total allocated retransmit time),

LQ(a,b1) . . . LQ(a,bm) (link quality to nodes requesting help), and h1(L) . . . hn(L) (retries available for hx).

The goal for an individual help window allocation is to maximize total successful retransmits. That is, to maximize the sum of P(h1) . . . P(hn), where P(h) represents the probability a particular help request will be successfully fulfilled. P(h) is equal to $P_{h(R)}(h)$, the probability "h" will be fulfilled over the h(R) retries available to "h," and assumes $P_1(h)$ (the base probability for one attempt) does not change between retries due to reallocation or LQ changes. This assumption is the best guess for what allocation/LQ will look like during future retries. $P_{h(R)}(h)$ is given by the sum of $P_1(h)+P_1(h)*(1-P_1(h))+ \ldots +P_1(h)*(1-P_1(h))^{n-1}$, a geometric series that simplifies to $1-(1-P_1(h))^{n+1}$. $P_1(h)$ for a candidate assignment of helper nodes b1 . . . bx to "h" (where b1 could retransmit "h" multiple times and would be represented multiple times in the following sum) is given by the sum of (LQ(a,b1)+(1−LQ(a,b1))*(Ph(b2 . . . bm)) and Ph(b2 . . . bm) is LQ(a,b2)+(1−LQ(a,b2))*Ph(b3 . . . bm).

Because "a(t)" may allow transmitting multiple "h" fulfillments, each of these fulfillments could be assigned to any outstanding "h", optimizing the sum of P(h1) . . . P(hn) even with one retry represents a potentially large search space. To simplify the search space and make the algorithm run in reasonable time, we note that the node "a" with the lowest maximum LQ has the greatest to gain from multiple attempts (3 attempts of 0.25 probability yields an overall probability of 0.58, a gain of 0.32, whereas 3 attempts of 0.9 probability yields an overall probability of 0.999, a gain of 0.099).

For each "h", we calculate $P_{h(R)-1}(h)$ using the maximum LQ (a,b) of "h." The decrementing of h(R) ensures that the help requests are prioritized for which this is the last available fulfillment window, which will have a $P_{h(R)-1}(h)$ of 0. Fulfillment slots are allocated from low $P_{h(R)-1}(h)$ to high. For all "0" values where this is the last chance window, we allocate first the best LQ(a,b) to the node with the lowest maximum LQ. This could tap out the available fulfillment slots of "a" and result in another node's achievable P(h) decreasing by more than was just gained. To address this shortcoming of our basic assumption we use well documented standard "optimal allocation" search algorithms, using any free processor cycles and time before transmission must be performed to do so. Likewise, as we allocate to requests with non-zero $P_{h(R)-1}(h)$, we can optimize our baseline assumption (allocating fulfillment slots from low $P_{h(R)-1}(h)$ to high) by traversing the search space more deeply if we have time.

For some embodiments, the methods and AV systems disclosed above implement a host centered approach in which the host is the only node with a complete network map of the quality of links within the mesh network. The software associated with the host node can be easily updated. In the centrally managed case, the host sets up the help fulfillment window schedule using the link status from each node before it has synchronized the schedule with all nodes, which introduces a delay factor. The host guarantees a synchronized schedule and thus performs a schedule update and acknowledgement with all nodes so that two nodes do not collide in transmitting based on using an incompatible schedule. The host centered approach allows the host to assign more bandwidth to a well-positioned node that can help out significantly better than any other node. The host can change the allocation of "help time" assigned to each node in order to give a well-positioned node more time to help. The host can also decrease the amount of data and bandwidth allocation that passes through to a "bad" node by reducing the bit-rate of that node's audio or video samples. The host can also control which nodes are helped during a help fulfillment window of a given node based on the link quality mapping of the mesh network.

For other embodiments, the methods disclosed above implement a distributed approach in which all nodes have a complete network map of the quality of links within the mesh network. The distributed approach is particularly effective for detecting transient link problems because each node has the updated quality of link information to quickly detect transient problems. In this distributed approach, the help fulfillment window schedule can be configured using the PCA. Instantaneous or immediate help fulfillment messages for a given node are determined by executing an algorithm (e.g., FPPA) at each node.

Thus, depending on the radio and room characteristics, it may make sense to use either or both techniques. For example, the host can slowly tweak the immediate help schedule over time to give more immediate help time to nodes that have shown a statistical likelihood for being able to help during transient issues. Also, to reach a threshold level of average probability of a help request being fulfilled over the retries available to the help request [Ph(R)] for a node over time, the host can reduce the bit depth of the audio samples. This results in a less clear sound, but is preferable compared to audio dropouts. This option can easily be incorporated into the algorithm for achieving an acceptable expected delivery percentage. Halving the bit depth yields twice the packet repeats for a given schedule and the new Ph(R) can be calculated accordingly.

Meanwhile, a distributed decision could be used for short-term responses to help requests, where the most up-to-date link quality is important in order to increase the likelihood that a help request is satisfied within the data expiration time. Even if this means bandwidth for immediate help must be divided equally among nodes that may have widely varying abilities to actually help.

The present invention also relates to an apparatus for performing the operations described herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method operations.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc. The machine readable medium can store executable program instructions which when executed cause a data processing system to perform the methods described above.

Figure 17:
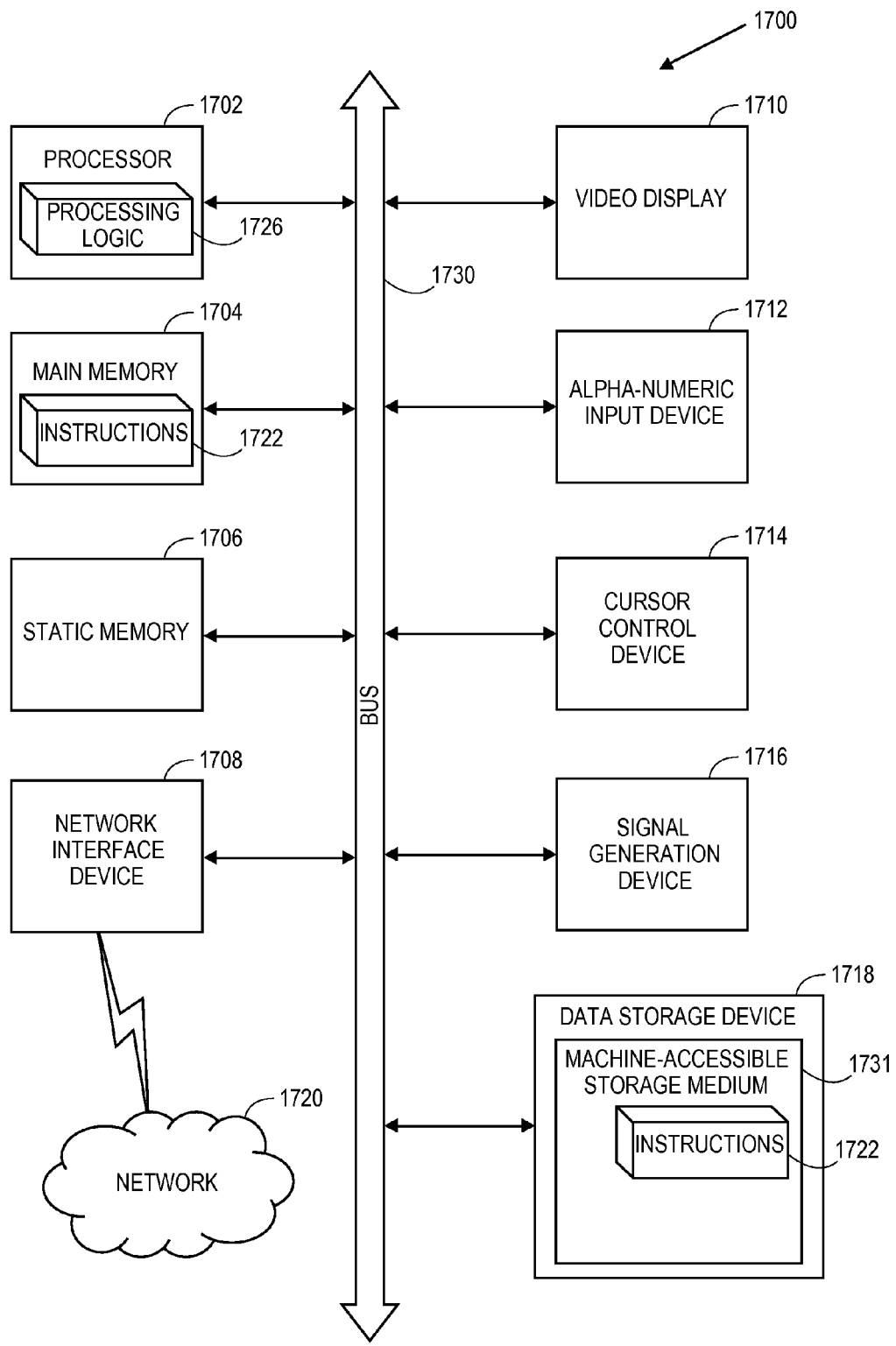
FIG. 17 illustrates a diagrammatic representation of a machine in the exemplary form of a computer system 1700 within which a set of instructions, for causing the machine to perform any one or more of the methodologies discussed herein, may be executed.

FIG. 17 illustrates a diagrammatic representation of a machine in the exemplary form of a data processing system (e.g., computer system 1700) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 1700 includes a processing device (processor) 1702, a main memory 1704 (e.g., read-only memory (ROM), flash memory, dynamic random access memory (DRAM) such as synchronous DRAM (SDRAM) or Rambus DRAM (RDRAM), etc.), a static memory 1706 (e.g., flash memory, static random access memory (SRAM), etc.), and a data storage device 1718, which communicate with each other via a bus 1730.

Processor 1702 represents one or more general-purpose processing devices such as a microprocessor, central processing unit, or the like. More particularly, the processor 1702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 1702 may also be one or more special-purpose processing devices such as an application specific integrated circuit (ASIC), a field programmable gate array (FPGA), a digital signal processor (DSP), network processor, or the like. The processor 1702 is configured to execute the processing logic 1726 for performing the operations and steps discussed herein.

The computer system 1700 may further include a network interface device 1708. The computer system 1700 also may include a video display unit 1710 (e.g., a liquid crystal display (LCD) or a cathode ray tube (CRT)), an alphanumeric input device 1712 (e.g., a keyboard), a cursor control device 1714 (e.g., a mouse), and a signal generation device 1716 (e.g., a speaker).

The data storage device 1718 may include a machine-accessible storage medium 1731 on which is stored one or more sets of instructions (e.g., software 1722) embodying any one or more of the methodologies or functions described herein. The software 1722 may also reside, completely or at least partially, within the main memory 1704 and/or within the processor 1702 during execution thereof by the computer system 1700, the main memory 1704 and the processor 1702 also constituting machine-accessible storage media. The software 1722 may further be transmitted or received over a network 1720 via the network interface device 1708.

The machine-accessible storage medium 1731 may also be used to store data structure sets that define user identifying states and user preferences that define user profiles. Data structure sets and user profiles may also be stored in other sections of computer system 1700, such as static memory 1706.

While the machine-accessible storage medium 1731 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical, and magnetic media.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for optimizing wireless communications in a mesh network, comprising:
   transmitting a data stream from a wireless module (WM) host to a plurality of WM devices in the mesh network;
   sending status messages from the WM devices to the WM host and the other WM devices with the WM devices being configured to transmit help requests and respond to help requests based on at least one WM device needing help receiving the data stream;
   generating a WM host link quality map at the WM host with the WM host link quality map being dynamically updated upon receiving status messages from the WM devices; and
   executing a first algorithm to dynamically allocate a help fulfillment window schedule.

2. The method of claim 1, wherein the first algorithm is a WM host probabilistic prioritization algorithm for dynamically allocating the help fulfillment window schedule depending on the quality of links between the WM devices and to tune bit rates of the data stream for each WM device depending on the quality of link between each WM device and the WM host.

3. The method of claim 1, further comprising:
   preparing control data including updates of the help fulfillment window schedule; and
   executing a second algorithm to select help requests to fulfill for each WM device.

4. The method of claim 3, further comprising:
   sending control data and help fulfillment messages from the WM host; and
   sending control data and help fulfillment messages from the WM devices with a sequence number associated with the WM device that is sending the control data.

5. The method of claim 1, further comprising:
   determining whether any WM devices are missing data from the WM host; and
   resending the data to WM devices needing the data with an implied help request and desired expiration that other WM devices will service.

6. The method of claim 1, further comprising:
   generating link quality maps at each WM device with each link quality map associated with a WM device being dynamically updated upon receiving status messages from other WM devices.

7. The method of claim 1, wherein the first algorithm further comprises:
   summing a number of help fulfillment messages received at a given WM device from all other WM devices;
   dividing the number by a total number of help fulfillment message which equal a relative fulfillment ratio for the given WM device;
   assigning the relative fulfillment ratio for the given WM device multiplied by the total time per help window to the given WM device; and
   providing an updated help fulfillment window schedule to a control packet generator based on schedule lines being moved by an aggregate total that is greater than a first threshold.

8. The method of claim 7, wherein the first algorithm further comprises:
   reducing a bit rate of the data stream at the given WM device based on a help request delivery probability to the given WM device decreasing below a second threshold.

9. The method of claim 1, wherein WM host link quality map comprises link quality information for direct wireless links between the WM host and directly linked WM devices and also indirect wireless links between the WM devices.

10. The method of claim 1, wherein the WM host is located in an audio video receiver with functionality of the AV receiver being located in one of a TV, a DVD player, and an integrated TV/DVD player.

11. A method for optimizing wireless communications within a mesh network, comprising:
    transmitting a data stream from a wireless module (WM) host to a plurality of WM devices in the mesh network;
    sending status messages from the WM devices to the WM host and the other WM devices with the WM devices being configured to transmit help requests and respond to help requests based on at least one WM device needing help receiving the data stream; and
    generating a link quality map of the mesh network at each WM device with the link quality maps being dynamically updated upon receiving status messages from the WM devices.

12. The method of claim 11, further comprising:
executing a first algorithm to dynamically allocate a help fulfillment window schedule and to tune bit rates of the data stream for each WM device depending on the quality of link between the WM device and the WM host.

13. The method of claim 11, further comprising:
preparing control data including updates of the help fulfillment window schedule; and
executing a second algorithm to select help requests to fulfill for each WM device.

14. The method of claim 13, further comprising:
sending control data and help fulfillment messages from the WM host; and
sending control data and help fulfillment messages from the WM devices with a sequence number associated with the WM device that is sending the control data based on the second algorithm.

15. The method of claim 13, wherein the help fulfillment window schedule is determined by one of an explicit schedule and a randomized contention mechanism.

16. The method of claim 13, wherein the second algorithm further comprises:
determining a current fulfillment window under examination;
initializing a probability of delivery of all help requests to zero;
ranking help requests expiring in the current fulfillment window or a later fulfillment window by how much increase in probability of delivery is ensured by assigning a best available helper for each help request based on link quality compared to a second best helper;
assigning a highest ranked help request to its best available helper;
reranking the highest ranked help request based on a new expected delivery probability; and
determining if all fulfillment window help slots are filled.

17. The method of claim 11, wherein the link quality map associated with each WM device comprises link quality information for direct and indirect wireless links between the particular WM device and the other WM devices and between the particular WM device and the WM host.

18. The method of claim 11, wherein the WM host is located in an audio video receiver with functionality of the AV receiver being located in one of a TV, a DVD player, and an integrated TV/DVD player.

19. The method of claim 11, wherein the data stream comprises one of audio data, video data, and audio and video data.

20. An apparatus, comprising:
an audio video (AV) receiver with a wireless module (WM) host that is configured to transmit a data stream to a plurality of wireless nodes each having a WM device to enable bi-directional communications with the WM host, wherein each WM device includes memory to store the data stream and a processing unit that is configured to send status messages from the WM device to the WM host and the other WM devices with the WM devices being configured to transmit help requests and respond to help requests based on at least one WM device needing help receiving the data stream.

21. The apparatus of claim 20, wherein the WM host includes a processing unit that is configured to generate a WM host link quality map that is dynamically updated upon receiving status messages from the WM devices.

22. The apparatus of claim 21, wherein the processing unit of the WM host is further configured to execute a first algorithm to dynamically allocate a help fulfillment window schedule and to tune bit rates of the data stream for each WM device depending on the quality of link between each WM device and the WM host.

23. The apparatus of claim 21, wherein the processing unit of the WM host is further configured to prepare control data including updates of the help fulfillment window schedule.

24. The apparatus of claim 20, wherein the processing unit of each WM device is further configured to execute a second algorithm to select help requests to fulfill for each WM device and to generate link quality maps at each WM device with each link quality map associated with a WM device being dynamically updated upon receiving status messages from other WM devices.

25. The apparatus of claim 20, wherein the functionality of the AV receiver is located in one of a HDMI DVD player, a HDMI TV, an integrated HDMI DVD player/TV, an AV receiver, a DVD player, a DVR, a hard disc player, an optical disc player, a blu-ray disc player, a computer, a MP3 player, a television, and a smart phone.

26. A system, comprising:
an audio video (AV) source having a wireless module (WM) host that is configured to transmit a data stream to a plurality of wireless nodes each having a WM device to enable bi-directional communications with the WM host, wherein each WM device includes memory to store the data stream and a processing unit that is configured to send status messages from the WM device to the WM host and the other WM devices with the WM devices being configured to transmit help requests and respond to help requests based on at least one WM device needing help receiving the data stream.

27. The system of claim 26, wherein the processing unit of each WM device is further configured to generate a link quality map that is dynamically updated upon receiving status messages from the WM devices with the WM host link quality map associated with each WM device being stored in the memory of each WM device.

28. The system of claim 26, wherein the processing unit of each WM device is further configured to execute a fulfillment probabilistic prioritization algorithm to select help requests to fulfill for each WM device.

29. The system of claim 26, wherein the functionality of the AV source is located in one of a HDMI DVD player, a HDMI TV, an integrated HDMI DVD player/TV, an AV receiver, a DVD player, a DVR, a hard disc player, an optical disc player, a blu-ray disc player, a computer, a MP3 player, a television, and a smart phone.

30. The system of claim 26, wherein each wireless node further comprises at least one of a wireless speaker, a wireless display, an integrated wireless speaker/display, and a repeater node.

31. The system of claim 30, wherein the wireless speakers comprise a front left speaker, a front right speaker, a center speaker, a surround left speaker, a surround right speaker, a first low frequency effect (LFE) speaker, a side left surround speaker, a side right surround speaker, and a second LFE speaker.

32. A non-transitory machine readable medium storing executable program instructions which when executed cause a data processing system to perform a method comprising:
transmitting a data stream from a wireless module (WM) host to a plurality of WM devices in the mesh network;
sending status messages from the WM devices to the WM host and the other WM devices with the WM devices being configured to transmit help requests and respond to help requests based on at least one WM device needing help receiving the data stream;

generating a WM host link quality map at the WM host with the WM host link quality map being dynamically updated upon receiving status messages from the WM devices; and executing a first algorithm to dynamically allocate a help fulfillment window schedule.

33. The medium of claim 32, wherein the first algorithm is a WM host probabilistic prioritization algorithm for dynamically allocating the help fulfillment window schedule depending on the quality of links between the WM devices and to tune bit rates of the data stream for each WM device depending on the quality of link between each WM device and the WM host.

34. The medium of claim 32, further comprising:

preparing control data including updates of the help fulfillment window schedule;

executing a second algorithm to select help requests to fulfill for each WM device;

sending control data and help fulfillment messages from the WM host; and sending control data and help fulfillment messages from the WM devices with a sequence number associated with the WM device that is sending the control data.

35. A non-transitory machine readable medium storing executable program instructions which when executed cause a data processing system to perform a method comprising:

transmitting a data stream from a wireless module (WM) host to a plurality of WM devices in the mesh network;

sending status messages from the WM devices to the WM host and the other WM devices with the WM devices being configured to transmit help requests and respond to help requests based on at least one WM device needing help receiving the data stream; and generating a link quality map of the mesh network at each WM device with the link quality maps being dynamically updated upon receiving status messages from the WM devices.

36. The medium of claim 35, further comprising:

executing a first algorithm to dynamically allocate a help fulfillment window schedule and to tune bit rates of the data stream for each WM device depending on the quality of link between the WM device and the WM host;

preparing control data including updates of the help fulfillment window schedule; and executing a second algorithm to select help requests to fulfill for each WM device.

37. The medium of claim 36, wherein the second algorithm further comprises:

determining a current fulfillment window under examination;

initializing a probability of delivery of all help requests to zero;

ranking help requests expiring in the current fulfillment window or a later fulfillment window by how much increase in probability of delivery is ensured by assigning a best available helper for each help request based on link quality compared to a second best helper;

assigning a highest rank help request to its best available helper;

reranking the highest rank help request based on a new expected delivery probability; and determining if all fulfillment window help slots are filled.

* * * * *